US012387227B2

(12) United States Patent
Sullivan et al.

(10) Patent No.: US 12,387,227 B2
(45) Date of Patent: Aug. 12, 2025

(54) METHODS AND APPARATUS TO ESTIMATE CARDINALITY OF USERS REPRESENTED IN ARBITRARILY DISTRIBUTED BLOOM FILTERS

(71) Applicant: The Nielsen Company (US), LLC, New York, NY (US)

(72) Inventors: Jonathan Sullivan, Hurricane, UT (US); Diane Morovati Lopez, West Hills, CA (US); Christie Summers, Baltimore, MD (US); Jake Ryan Dailey, San Francisco, CA (US); Michael R. Sheppard, Holland, MI (US); DongBo Cui, Fresh Meadows, NY (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 18/298,814

(22) Filed: Apr. 11, 2023

(65) Prior Publication Data
US 2023/0245145 A1    Aug. 3, 2023

Related U.S. Application Data

(63) Continuation of application No. 17/007,774, filed on Aug. 31, 2020, now Pat. No. 11,676,160.
(Continued)

(51) Int. Cl.
*G06Q 30/0201* (2023.01)
*G06N 7/01* (2023.01)

(52) U.S. Cl.
CPC .......... *G06Q 30/0201* (2013.01); *G06N 7/01* (2023.01)

(58) Field of Classification Search
CPC ....... G06N 7/005; G06N 7/01; G06Q 30/0201
See application file for complete search history.

(56) References Cited

U.S. PATENT DOCUMENTS

| 6,108,637 | A  | 8/2000 | Blumenau |
| 8,370,489 | B2 | 2/2013 | Mazumdar et al. |

(Continued)

FOREIGN PATENT DOCUMENTS

| CN | 106874165 A  | 6/2017 |
| JP | 2011182163 A | 9/2011 |

OTHER PUBLICATIONS

Geiringer, "On the Probability Theory of Arbitrarily Linked Events," Institute of Mathematical Statistics, Dec. 1938, 12 pages.
(Continued)

*Primary Examiner* — Deirdre D Hatcher

(57) ABSTRACT

Methods, apparatus, systems, and articles of manufacture to estimate cardinality of users represented in arbitrarily distributed bloom filter arrays are disclosed. A system includes a communication interface to: access a first Bloom filter array representative of first entries in a first database, the first entries allocated to ones of first elements in the first Bloom filter array based on a non-uniform distribution of outputs of a hash function applied to the first entries, and access a second Bloom filter array representative of second entries in a second database. The system also includes machine readable instructions to cause one or more processors to estimate a cardinality of a union of the first and second entries based on the non-uniform distribution of the outputs of the hash function.

14 Claims, 13 Drawing Sheets

Related U.S. Application Data

(60) Provisional application No. 62/975,020, filed on Feb. 11, 2020.

(56) References Cited

U.S. PATENT DOCUMENTS

| | | | |
|---|---|---|---|
| 8,600,921 | B2 | 12/2013 | Burkard et al. |
| 8,930,701 | B2 | 1/2015 | Burbank et al. |
| 9,237,138 | B2 | 1/2016 | Bosworth et al. |
| 9,361,322 | B1 | 6/2016 | Dutta et al. |
| 9,596,202 | B1 | 3/2017 | Beach et al. |
| 9,600,921 | B2 | 3/2017 | Thomaszewski et al. |
| 10,963,922 | B1 | 3/2021 | Andersen et al. |
| 11,216,588 | B1* | 1/2022 | An ..................... G06F 21/6227 |
| 11,676,160 | B2 | 6/2023 | Sullivan et al. |
| 11,741,068 | B2 | 8/2023 | Sheppard et al. |
| 2009/0296594 | A1* | 12/2009 | Cao ..................... H04L 43/00 370/252 |
| 2010/0070514 | A1 | 3/2010 | Woodruff |
| 2014/0149433 | A1 | 5/2014 | Lakshminarayan |
| 2015/0178769 | A1 | 6/2015 | Mirisola et al. |
| 2016/0048868 | A1 | 2/2016 | Mirisola et al. |
| 2016/0188623 | A1* | 6/2016 | Finlay ................ G06F 16/2255 707/690 |
| 2016/0292716 | A1 | 10/2016 | Mirisola et al. |
| 2017/0103417 | A1 | 4/2017 | Nguyen et al. |
| 2017/0323200 | A1* | 11/2017 | Corvinelli .............. G06N 3/048 |
| 2018/0349364 | A1 | 12/2018 | Arnold |
| 2019/0026221 | A1 | 1/2019 | Bar-Joshua |
| 2019/0272388 | A1 | 9/2019 | Tsou et al. |
| 2020/0007919 | A1 | 1/2020 | Sheppard et al. |
| 2021/0117428 | A1 | 4/2021 | Dalgliesh |
| 2021/0248629 | A1 | 8/2021 | Sullivan et al. |
| 2021/0359836 | A1 | 11/2021 | Wright et al. |
| 2021/0359846 | A1 | 11/2021 | Wright et al. |
| 2021/0406240 | A1 | 12/2021 | Sheppard et al. |
| 2022/0036390 | A1 | 2/2022 | Sheppard et al. |
| 2022/0084074 | A1 | 3/2022 | Maddern et al. |
| 2022/0138831 | A1 | 5/2022 | Yoo |
| 2022/0261853 | A1 | 8/2022 | Publicover et al. |
| 2023/0004997 | A1 | 1/2023 | Sheppard et al. |

OTHER PUBLICATIONS

Bloom, "Space/Time Trade-offs in Hash Coding Errors," Computer Usage Company, vol. 13, No. 7, Jul. 1970, 5 pages.

Johnson et al., "Urn Models and Their Application an Approach to Modern Discrete Probability Theory," John Wiley & Sons, Inc., 1977, 413 pages.

Broder et al., "Network Application of Bloom Filters: A Survey", Internet Mathematics, vol. 1, No. 4, Apr. 14, 2004, 25 pages.

Swamidass et al., "Mathematical Correction for Fingerprint Similarity Measures to Improve Chemical Retrieval," J. Chem. Inf. Model 2007, Nov. 20, 2006, 13 pages.

Many et al., "Fast Private Set Operations with SEPIA," Mar. 1, 2012, 11 pages.

Tschorsch et al., "An Algorithm for Privacy-Preserving Distributed User Statistics," Computer Engineering Group, Humboldt University of Berlin, Unter den Linden 6, DE 10099 Berlin, Germany, Jul. 1, 2013, 13 pages.

Erlingsson et al., "RAPPOR: Randomized Aggregatable Privacy-Preserving Ordinal Response," Proceedings of the 2014 ACM SIGSAC Conference on Computer and Communications Security Nov. 2014, 14 pages.

Dong et al., "Approximating Private Set Union Intersection Cardinality with Logarithmic Complexity," IEEE Transactions on Information Forensics and Security, Jun. 28, 2017, 20 pages.

Kanaujia et al., "Exploring Probabilistic Data Structures: Bloom Filters," May 2, 2018, 7 pages.

Shi et al., "Audience Size Forecasting," KDD 2018, Aug. 2018, 10 pages.

Stritzl, "Privacy Preserving Matching Using Bloom Filters; An Analysis and an Encrypted Variant", University of Twente, Apr. 4, 2019, 31 pages.

Wikipedia, "Differential Privacy," available at https://en.wikipedia.org/wiki/Differential_privacy, last edited Aug. 26, 2023, 12 pages.

Wikipedia, "Brent's Method," available at https://en.wikipedia.org/wiki/Brent%27s_method, last edited Aug. 9, 2022, 6 pages.

Wikipedia, "Bloom Filter," available at https://en.wikipedia.org/wiki/Bloom_filter, last edited Sep. 6, 2023, 21 pages.

Wright et al., "Privacy-Preserving Secure Cardinality and Frequency Estimation," Google LLC, May 29, 2020, 20 pages.

Linearlegions, "A Linear Size Cardinality Estimator" Technical Disclosure Commons, available at https://www.tdcommons.org/dpubs_series/3830, Nov. 29, 2020, 20 pages.

International Searching Authority, "Written Opinion," issued in connection with International Patent Application No. PCT/US2021/016773, mailed on May 25, 2021, 3 Pages.

International Searching Authority, "International Search Report," issued in connection with International Patent Application No. PCT/US2021/016773, mailed on May 25, 2021, 3 pages.

International Searching Authority, "International Preliminary Report on Patentability," issued in connection with International Patent Application No. PCT/US2021/016773, issued on Aug. 11, 2022, 4 pages.

United States Patent and Trademark Office, "Non-Final Office Action," issued in connection with U.S. Appl. No. 17/362,404, mailed on Sep. 13, 2022, 24 pages.

United States Patent and Trademark Office, "Non-Final Office Action," issued in connection with U.S. Appl. No. 16/945,055, mailed on Sep. 15, 2022, 8 pages.

United States Patent and Trademark Office, "Non-Final Office Action," issued in connection with U.S. Appl. No. 17/362,419, mailed on Dec. 5, 2022, 12 pages.

United States Patent and Trademark Office, "Final Office Action," issued in connection with U.S. Appl. No. 16/945,055, mailed on Jan. 26, 2023, 8 pages.

United States Patent and Trademark Office, "Final Office Action," issued in connection with U.S. Appl. No. 17/362,404, mailed on Feb. 21, 2023, 21 pages.

Egert et al., "Privately Computing Set-Union and Set-Intersection Cardinality via Bloom Filters," Information Security and Privacy, Jan. 2015, pp. 413-430.

Harmouch et al., "Cardinality Estimation: An Experimental Survey," Proceedings of the VLDB Endowment, Dec. 2017, vol. 11, Issue 4, 14 pages.

United States Patent and Trademark Office, "Non-Final Office Action," issued in connection with U.S. Appl. No. 17/007,774, mailed on Feb. 17, 2022, 12 pages.

United States Patent and Trademark Office, "Final Office Action," issued in connection with U.S. Appl. No. 17/007,774, mailed on Jul. 1, 2022, 18 pages.

United States Patent and Trademark Office, "Advisory Action," issued in connection with U.S. Appl. No. 17/007,774, mailed on Oct. 31, 2022, 3 pages.

United States Patent and Trademark Office, "Notice of Allowance and Fee(s) Due," issued in connection with U.S. Appl. No. 17/007,774, mailed on Jan. 11, 2023, 8 pages.

United States Patent and Trademark Office, "Notice of Allowance and Fee(s) Due," issued in connection with U.S. Appl. No. 17/362,419, mailed on Apr. 3, 2023, 6 pages.

United States Patent and Trademark Office, "Notice of Allowance and Fee(s) Due," issued in connection with U.S. Appl. No. 16/945,055, mailed on Apr. 21, 2023, 10 pages.

United States Patent and Trademark Office, "Advisory Action," issued in connection with U.S. Appl. No. 17/362,404, mailed on May 2, 2023, 3 pages.

United States Patent and Trademark Office, "Supplemental Notice of Allowability," issued in connection with U.S. Appl. No. 16/945,055, mailed on May 17, 2023, 8 pages.

United States Patent and Trademark Office, "Supplemental Notice of Allowability," issued in connection with U.S. Appl. No. 16/945,055, mailed on Jun. 12, 2023, 8 pages.

(56) References Cited

OTHER PUBLICATIONS

Xue, Qiao et al., "Distributed Set Intersection and Union with Local Differential Privacy," 2017 IEEE 23rd International Conference on Parallel and Distributed Systems (ICPADS), Dec. 2017, Shenzen, China, pp. 198-205.

* cited by examiner

METHODS AND APPARATUS TO ESTIMATE CARDINALITY OF USERS REPRESENTED IN ARBITRARILY DISTRIBUTED BLOOM FILTERS

RELATED APPLICATION

This patent arises from a continuation of U.S. patent application Ser. No. 17/007,774, now U.S. Pat. No. 11,676,160), which was filed on Aug. 31, 2020, and which claims the benefit of U.S. Provisional Patent Application No. 62/975,020, which was filed on Feb. 11, 2020. U.S. patent application Ser. No. 17/007,774 and U.S. Provisional Patent Application No. 62/975,020 are hereby incorporated herein by reference in their entireties. Priority to U.S. patent application Ser. No. 17/007,774 and U.S. Provisional Patent Application No. 62/975,020 is claimed.

FIELD OF THE DISCLOSURE

This disclosure relates generally to monitoring media exposure, and, more particularly, to methods and apparatus to estimate cardinality of users represented in arbitrarily distributed bloom filter arrays.

BACKGROUND

Traditionally, audience measurement entities determine audience exposure to media based on registered panel members. That is, an audience measurement entity (AME) enrolls people who consent to being monitored into a panel. The AME then monitors those panel members to determine media (e.g., television programs or radio programs, movies, DVDs, advertisements, webpages, streaming media, etc.) exposed to those panel members. In this manner, the AME can determine exposure metrics (e.g., audience size) for different media based on the collected media measurement data.

As people are accessing more and more media through digital means (e.g., via the Internet), it is possible for online publishers and/or database proprietors providing such media to track all instances of exposure to media (e.g., on a census wide level) rather than being limited to exposure metrics based on audience members enrolled as panel members of an AME. However, database proprietors are typically only able to track media exposure pertaining to online activity associated with the platforms operated by the database proprietors. Where media is delivered via multiple different platforms of multiple different database proprietors, no single database proprietor will be able to provide exposure metrics across the entire population to which the media was made accessible. Furthermore, such database proprietors have an interest in preserving the privacy of their users such that there are limitations on the nature of the exposure metrics such database proprietors are willing to share with one another and/or an interested third party such as an AME.

Figure 1:
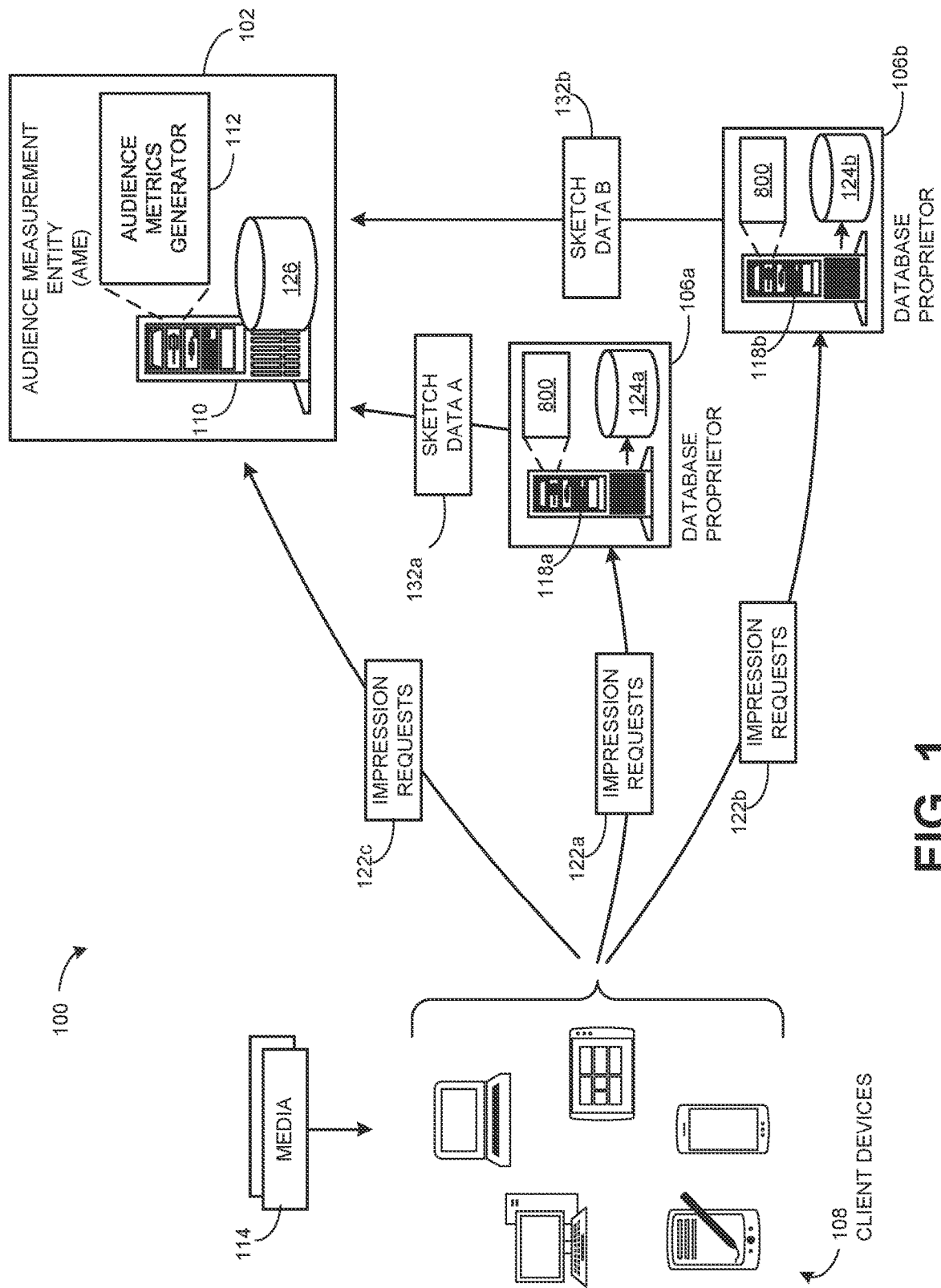
FIG. 1 is an example environment to implement a technique for logging impressions of accesses to server-based media.

The figures are not to scale. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

Techniques for monitoring user access to an Internet-accessible media, such as digital television (DTV) media and digital content ratings (DCR) media, have evolved significantly over the years. Internet-accessible media is also known as digital media. In the past, such monitoring was done primarily through server logs. In particular, entities serving media on the Internet would log the number of requests received for their media at their servers. Basing Internet usage research on server logs is problematic for several reasons. For example, server logs can be tampered with either directly or via zombie programs, which repeatedly request media from the server to increase the server log counts. Also, media is sometimes retrieved once, cached locally and then repeatedly accessed from the local cache without involving the server. Server logs cannot track such repeat views of cached media. Thus, server logs are susceptible to both over-counting and under-counting errors.

The inventions disclosed in Blumenau, U.S. Pat. No. 6,108,637, which is hereby incorporated herein by reference in its entirety, fundamentally changed the way Internet monitoring is performed and overcame the limitations of the server-side log monitoring techniques described above. For example, Blumenau disclosed a technique wherein Internet media to be tracked is tagged with monitoring instructions. In particular, monitoring instructions are associated with the hypertext markup language (HTML) of the media to be tracked. When a client requests the media, both the media and the monitoring instructions are downloaded to the client. The monitoring instructions are, thus, executed whenever the media is accessed, be it from a server or from a cache. Upon execution, the monitoring instructions cause the client to send or transmit monitoring information from the client to a content provider site. The monitoring information is indicative of the manner in which content was displayed.

In some implementations, an impression request or ping request can be used to send or transmit monitoring information by a client device using a network communication in the form of a hypertext transfer protocol (HTTP) request. In this manner, the impression request or ping request reports the occurrence of a media impression at the client device. For example, the impression request or ping request includes information to report access to a particular item of media (e.g., an advertisement, a webpage, an image, video, audio, etc.). In some examples, the impression request or ping request can also include a cookie previously set in the browser of the client device that may be used to identify a user that accessed the media. That is, impression requests or ping requests cause monitoring data reflecting information about an access to the media to be sent from the client device that downloaded the media to a monitoring entity and can provide a cookie to identify the client device and/or a user of the client device. In some examples, the monitoring entity is an audience measurement entity (AME) that did not provide the media to the client and who is a trusted (e.g., neutral) third party for providing accurate usage statistics (e.g., The Nielsen Company, LLC). Since the AME is a third party relative to the entity serving the media to the client device, the cookie sent to the AME in the impression request to report the occurrence of the media impression at the client device is a third-party cookie. Third-party cookie tracking is used by measurement entities to track access to media accessed by client devices from first-party media servers.

There are many database proprietors operating on the Internet. These database proprietors provide services to large numbers of subscribers. In exchange for the provision of services, the subscribers register with the database proprietors. As part of this registration, the subscribers may provide personally identifiable information (PII) including, for example, their name, their home address, their email address, etc. that is stored in a database operated and/or maintained by the database proprietor. Examples of such database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, Hulu, etc.), etc. These database proprietors set cookies and/or other device/user identifiers on the client devices of their subscribers to enable the database proprietors to recognize their subscribers when they visit their web sites.

The protocols of the Internet make cookies inaccessible outside of the domain (e.g., Internet domain, domain name, etc.) on which they were set. Thus, a cookie set in, for example, the facebook.com domain (e.g., a first party) is accessible to servers in the facebook.com domain, but not to servers outside that domain. Therefore, although AMEs (e.g., third parties) might find it advantageous to access the cookies set by the database proprietors, they are unable to do so.

The inventions disclosed in Mazumdar et al., U.S. Pat. No. 8,370,489, which is incorporated by reference herein in its entirety, enable an AME to leverage the existing databases of database proprietors to collect more extensive Internet usage by extending the impression request process to encompass partnered database proprietors and by using such partners as interim data collectors. The inventions disclosed in Mazumdar accomplish this task by structuring the AME to respond to impression requests from clients (who may not be a member of an audience measurement panel and, thus, may be unknown to the AME) by redirecting the clients from the AME to a database proprietor, such as a social network site partnered with the AME, using an impression response. Such a redirection initiates a communication session between the client accessing the tagged media and the database proprietor. For example, the impression response received at the client device from the AME may cause the client device to send a second impression request to the database proprietor. In response to the database proprietor receiving this impression request from the client device, the database proprietor (e.g., Facebook) can access any cookie it has set on the client to thereby identify the client based on the internal records of the database proprietor. In the event the client device corresponds to a subscriber of the database proprietor, the database proprietor logs/records a database proprietor demographic impression in association with the user/client device.

As used herein, an impression is defined to be an event in which a home or individual accesses and/or is exposed to media (e.g., an advertisement, content, a group of advertisements and/or a collection of content). In Internet media delivery, a quantity of impressions or impression count is the total number of times media (e.g., content, an advertisement, or advertisement campaign) has been accessed by a web population (e.g., the number of times the media is accessed). In some examples, an impression or media impression is logged by an impression collection entity (e.g., an AME or a database proprietor) in response to an impression request from a user/client device that requested the media. For example, an impression request is a message or communication (e.g., an HTTP request) sent by a client device to an impression collection server to report the occurrence of a media impression at the client device. In some examples, a media impression is not associated with demographics. In non-Internet media delivery, such as television (TV) media, a television or a device attached to the television (e.g., a set-top-box or other media monitoring device) may monitor media being output by the television. The monitoring generates a log of impressions associated with the media displayed on the television. The television and/or connected device may transmit impression logs to the impression collection entity to log the media impressions.

A user of a computing device (e.g., a mobile device, a tablet, a laptop, etc.) and/or a television may be exposed to the same media via multiple devices (e.g., two or more of a mobile device, a tablet, a laptop, etc.) and/or via multiple media types (e.g., digital media available online, digital TV (DTV) media temporality available online after broadcast, TV media, etc.). For example, a user may start watching the Walking Dead television program on a television as part of TV media, pause the program, and continue to watch the program on a tablet as part of DTV media. In such an example, the exposure to the program may be logged by an AME twice, once for an impression log associated with the television exposure, and once for the impression request generated by a tag (e.g., census measurement science (CMS) tag) executed on the tablet. Multiple logged impressions associated with the same program and/or same user are defined as duplicate impressions. Duplicate impressions are problematic in determining total reach estimates because one exposure via two or more cross-platform devices may be counted as two or more unique audience members. As used herein, reach is a measure indicative of the demographic coverage achieved by media (e.g., demographic group(s) and/or demographic population(s) exposed to the media). For example, media reaching a broader demographic base will have a larger reach than media that reaches a more limited demographic base. The reach metric may be measured by tracking impressions for known users (e.g., panelists or non-panelists) for which an audience measurement entity stores demographic information or can obtain demographic information. Deduplication is a process that is necessary to adjust cross-platform media exposure totals by reducing (e.g., eliminating) the double counting of individual audience members that were exposed to media via more than one platform and/or are represented in more than one database of media impressions used to determine the reach of the media.

As used herein, a unique audience is based on audience members distinguishable from one another. That is, a particular audience member exposed to particular media is measured as a single unique audience member regardless of how many times that audience member is exposed to that particular media or the particular platform(s) through which the audience member is exposed to the media. If that particular audience member is exposed multiple times to the same media, the multiple exposures for the particular audience member to the same media is counted as only a single unique audience member. In this manner, impression performance for particular media is not disproportionately represented when a small subset of one or more audience members is exposed to the same media an excessively large number of times while a larger number of audience members is exposed fewer times or not at all to that same media. By tracking exposures to unique audience members, a unique audience measure may be used to determine a reach measure to identify how many unique audience members are reached by media. In some examples, increasing unique audience and, thus, reach, is useful for advertisers wishing to reach a larger audience base.

An AME may want to find unique audience/deduplicate impressions across multiple database proprietors, custom date ranges, custom combinations of assets and platforms, etc. Some deduplication techniques perform deduplication across database proprietors using particular systems (e.g., Nielsen's TV Panel Audience Link). For example, such deduplication techniques match or probabilistically link personally identifiable information (PII) from each source. Such deduplication techniques require storing massive amounts of user data or calculating audience overlap for all possible combinations, neither of which are desirable. PII data can be used to represent and/or access audience demographics (e.g., geographic locations, ages, genders, etc.).

In some situations, while the database proprietors may be interested in collaborating with an AME, the database proprietor may not want to share the PII data associated with its subscribers to maintain the privacy of the subscribers. One solution to the concerns for privacy is to share sketch data that provides summary information about an underlying dataset without revealing PII data for individuals that may be included in the dataset. Not only does sketch data assist in protecting the privacy of users represented by the data, sketch data also serves as a memory saving construct to represent the contents of relatively large databases using relatively small amounts of date. Further, not only does the relatively small size of sketch date offer advantages for memory capacity but it also reduces demands on processor capacity to analyze and/or process such data.

Sketch data may include a cardinality defining the number of individuals represented by the data (e.g., subscribers) while maintaining the identity of such individuals private. The cardinality of sketch data associated with media exposure is a useful piece of information for an AME because it provides an indication of the number of audience members exposed to particular media via a platform maintained by the database proprietor providing the sketch data. However, in some instances, sketch data may be provided by database proprietors without providing an indication of the cardinality of the data. Even when the cardinality for sketch data is provided, problems for audience metrics arise when the media may be accessed via multiple different database proprietors that each provide separate sketch data summarizing the individual subscribers that were exposed to the media. In particular, the sum of the cardinalities of each sketch data is not a reliable estimate of the unique audience size because the same individual may be represented in multiple datasets associated with different sketch data. As a result, such individuals will be double counted (or possibly more than twice if there are more than two datasets being aggregated) resulting in the incorrect inflation of the unique audience size. Furthermore, identifying overlap between two different sets of sketch data (e.g., to deduplicate the users represented in the data) is non-trivial because, as stated above, the sketch data is generated to preserve the identity and privacy of the individuals represented thereby. Examples disclosed herein overcome the above challenges by enabling the estimation of a total cardinality of users represented in sketch data associated with two or more different datasets so that an AME may be able to deduplicate individuals represented in more than one of the datasets, thereby enabling the accurate estimate of the unique audience for a particular media item. Furthermore, the cardinality estimation in examples disclosed herein may be made with or without database proprietors providing the dataset-specific cardinalities associated with the different data sketches being combined.

Notably, although third-party cookies are useful for third-party measurement entities in many of the above-described techniques to track media accesses and to leverage demographic information from third-party database proprietors, use of third-party cookies may be limited or may cease in some or all online markets. That is, use of third-party cookies enables sharing anonymous PII subscriber information across entities which can be used to identify and deduplicate audience members across database proprietor impression data. However, to reduce or eliminate the possibility of revealing user identities outside database proprietors by such anonymous data sharing across entities, some websites, internet domains, and/or web browsers will stop (or have already stopped) supporting third-party cookies. This will make it more challenging for third-party measurement entities to track media accesses via first-party servers. That is, although first-party cookies will still be supported and useful for media providers (e.g., database proprietors) to track accesses to media via their own first-party servers, neutral third parties interested in generating neutral, unbiased audience metrics data will not have access to the impression data collected by the first-party servers using first-party cookies. Examples disclosed herein may be implemented with or without the availability of third-party cookies because, as mentioned above, the datasets used in the deduplication process are generated and provided by database proprietors, which may employ first-party cookies to track media impressions from which the datasets (e.g., sketch data) is generated.

Although examples disclosed herein are described in association with audience metrics related to media impressions, examples disclosed herein may be similarly used for other applications to deduplicate between multiple different datasets while preserving privacy. The datasets themselves need not be audiences or email addresses. They could be, for example, bank accounts, lists of purchased items, store visits, traffic patterns, etc. The datasets could be represented as lists of numbers or any other information represented as unique entries in a database.

FIG. 1 shows an example environment 100 that includes an example audience measurement entity (AME) 102, a first example database proprietor 106a, a second example database proprietor 106b, and example client devices 108. The example AME 102 includes an example AME computer 110 that implements an example audience metrics generator 112 to determine audience sizes based on media impressions logged by the database proprietors 106a-b. In the illustrated example of FIG. 1, the AME computer 110 may also implement an impression monitor system to log media impressions reported by the client devices 108. In the illustrated example of FIG. 1, the client devices 108 may be stationary or portable computers, handheld computing devices, smart phones, Internet appliances, smart televisions, and/or any other type of device that may be connected to the Internet and capable of accessing and/or presenting media.

As used herein, an audience size is defined as a number of deduplicated or unique audience members exposed to a media item of interest for audience metrics analysis. A deduplicated or unique audience member is one that is counted only once as part of an audience size. Thus, regardless of whether a particular person is detected as accessing a media item once or multiple times, that person is only counted once in the audience size for that media item. Audience size may also be referred to as unique audience or deduplicated audience.

As used herein, a media impression is defined as an occurrence of access and/or exposure to media 114 (e.g., an advertisement, a movie, a movie trailer, a song, a web page banner, etc.). Examples disclosed herein may be used to monitor for media impressions of any one or more media types (e.g., video, audio, a web page, an image, text, etc.).

In examples disclosed herein, the media 114 may be content and/or advertisements. Examples disclosed herein are not restricted for use with any particular type of media. On the contrary, examples disclosed herein may be implemented in connection with tracking impressions for media of any type or form in a network.

In the illustrated example of FIG. 1, content providers and/or advertisers distribute the media 114 via the Internet to users that access websites and/or online television services (e.g., web-based TV, Internet protocol TV (IPTV), etc.). The content providers may be the same as or different entities than the database proprietors 106a-b. In some examples, the media 114 is served by media servers of the same internet domains as the database proprietors 106a-b. For example, the database proprietors 106a-b include corresponding database proprietor servers 118a-b that can serve media 114 to their corresponding subscribers via the client devices 108. Examples disclosed herein can be used to generate audience metrics data that measures audience sizes of media served by different ones of the database proprietors 106a-b. For example, the database proprietors 106a-b may use such audience metrics data to promote their online media serving services (e.g., ad server services, media server services, etc.) to prospective clients. By showing audience metrics data indicative of audience sizes drawn by corresponding ones of the database proprietors 106a-b, the database proprietors 106a-b can sell their media serving services to customers interested in delivering online media to users.

In some examples, the media 114 is presented via the client devices 108. When the media 114 is accessed by the client devices 108, the client devices 108 send impression requests 122a-b to the database proprietor servers 118a-b to inform the database proprietor servers 118a-b of the media accesses. In this manner, the database proprietor servers 118a-b can log media impressions in impression records of corresponding database proprietor audience metrics databases 124a-b. In some examples, when a database proprietor server 118a-b serves the media 114, the impression request 122a-b includes a first-party cookie set by that database proprietor server 118a-b so that the database proprietor server 118a-b can log an impression for the media 114 without using a third-party cookie. In some examples, the client devices 108 also send impression requests 122c to the AME 102 so that the AME 102 can log census impressions in an AME audience metrics database 126. In the illustrated example of FIG. 1, the database proprietors 106a-b log demographic impressions corresponding to accesses by the client devices 108 to the media 114. Demographic impressions are impressions logged in association with demographic information collected by the database proprietors 106a-b from registered subscribers of their services. Also, in the illustrated example of FIG. 1, the AME computer 110 logs census-level media impressions corresponding to accesses by client devices 108 to media 114. Census-level media impressions (e.g., census impressions) are impressions logged regardless of whether demographic information is known for those logged impressions. In some examples, the census impressions include some media impressions accessed via a platform maintained by the first database proprietor 106a and some media impressions accessed via a platform maintained by the second database proprietor 106b. In some examples, the AME computer 110 does not collect impressions, and examples disclosed herein are based on audience data from impressions collected by the database proprietors 106a-b. For instance, the AME computer 110 may not collect impressions if the database proprietors 106a-b do not allow or support third-party cookies on their platforms.

In some examples, the media 114 is encoded to include a media identifier (ID). The media ID may be any identifier or information that can be used to identify the corresponding media 114. In some examples the media ID is an alphanumeric string or value. In some examples, the media ID is a collection of information. For example, if the media 114 is an episode, the media ID may include program name, season number, and/or episode number. When the example media 114 includes advertisements, such advertisements may be content and/or advertisements. The advertisements may be individual, standalone ads and/or may be part of one or more ad campaigns. In some examples, the ads of the illustrated example are encoded with identification codes (e.g., data) that identify the associated ad campaign (e.g., campaign ID, if any), a creative type ID (e.g., identifying a Flash-based ad, a banner ad, a rich type ad, etc.), a source ID (e.g., identifying the ad publisher), and/or a placement ID (e.g., identifying the physical placement of the ad on a screen). In some examples, advertisements tagged with the monitoring instructions are distributed with Internet-based media content such as, for example, web pages, streaming video, streaming audio, IPTV content, etc. As noted above, methods, apparatus, systems, and/or articles of manufacture disclosed herein are not limited to advertisement monitoring but can be adapted to any type of content monitoring (e.g., web pages, movies, television programs, etc.).

In some examples, the media 114 of the illustrated example is tagged or encoded to include monitoring or tag instructions, which are computer executable monitoring instructions (e.g., Java, java script, or any other computer language or script) that are executed by web browsers that access the media 114 via, for example, the Internet. Execution of the monitoring instructions causes the web browser to send the impression requests 122a-c (e.g., also referred to as tag requests) to one or more specified servers of the AME 102, the first database proprietor 106a, and/or the second database proprietor 106b. As used herein, impression requests 122a-c are used by the client devices 108 to report occurrences of media impressions caused by the client devices accessing the media 114. In the illustrated example, the impression requests 122a-b include user-identifying information that the database proprietors 106a-b can use to identify the subscriber that accessed the media 114. For example, when a subscriber of the first database proprietor 106a logs into a server of the first database proprietor 106a via a client device 108, the first database proprietor 106a sets a database proprietor cookie on the client device 108 and maps that cookie to the subscriber's identity/account information at the database proprietor server 118a. In examples disclosed herein, subscriber identity and/or subscriber account information includes personally identifiable information (PII) such as full name, street address, residence city and state, telephone number, email address, age, date of birth, social security number, demographic information, and/or any other personal information provided by subscribers in exchange for services from the database proprietors 106a-b. By having such PII data mapped to database proprietor cookies, the first database proprietor 106a can subsequently identify the subscriber based on the database proprietor cookie to determine when that user accessed different media 114 and to log an impression in association with demographics and/or other PII data of that user. In the illustrated example of FIG. 1, the impression requests 122a-b include database proprietor cookies of the client devices 108 to inform the database proprietors 106a-b of the particular subscribers that accessed the media 114. In some examples, the AME 102 also sets AME cookies in the client devices 108 to identify users that are enrolled in a panel of the AME 102 such that the AME 102 collects PII data of people that agree to having their internet activities monitored by the AME 102.

The impression requests 122a-c may be implemented using HTTP requests. However, whereas HTTP requests are network communications that traditionally identify web pages or other resources to be downloaded, the impression requests 122a-c of the illustrated example are network communications that include audience measurement information (e.g., ad campaign identification, content identifier, and/or user identification information) as their payloads. The server (e.g., the AME computer 110 and/or the database proprietor servers 118a-b) to which the impression requests 122a-c are directed is programmed to log occurrences of impressions reported by the impression requests 122a-c. Further examples of monitoring instructions (e.g., beacon instructions) and uses thereof to collect impression data are disclosed in Mazumdar et al., U.S. Pat. No. 8,370,489, entitled "Methods and Apparatus to Determine Impressions using Distributed Demographic Information," which is hereby incorporated herein by reference in its entirety.

In other examples in which the media 114 is accessed by apps on mobile devices, tablets, computers, etc. (e.g., that do not employ cookies and/or do not execute instructions in a web browser environment), an app publisher (e.g., an app store) can provide a data collector in an install package of an app for installation at the client devices 108. When a client device 108 downloads the app and consents to the accompanying data collector being installed at the client device 108 for purposes of audience/media/data analytics, the data collector can detect when the media 114 is accessed at the client device 108 and cause the client device 108 to send one or more of the impression requests 122a-c to report the access to the media 114. In such examples, the data collector can obtain user identifiers and/or device identifiers stored in the client devices 108 and send them in the impression requests 122a-c to enable the database proprietors 106a-b and/or the AME 102 to log impressions. Further examples of using a collector in client devices to collect impression data are disclosed in Burbank et al., U.S. Pat. No. 8,930,701, entitled "Methods and Apparatus to Collect Distributed User Information for Media Impressions and Search Terms," and in Bosworth et al., U.S. Pat. No. 9,237,138, entitled "Methods and Apparatus to Collect Distributed User Information for Media Impressions and Search Terms," both of which are hereby incorporated herein by reference in their entireties.

In some examples, the database proprietor servers 118a-b may additionally or alternatively user server logs to log impressions based on requests for media 114 from the client devices 108. For example, when a user of a client device 108 provides a URL or selects an item of media for viewing, the client device 108 sends an HTTP request (e.g., the impression request 122a-b) to a database proprietor server 118, a-b that includes the first-party cookie and an identifier of the requested media. In response, the database proprietor server 118a-b serves the requested media to the client device 108 and logs an impression of the media as attributable to the client device 108.

Typically, the database(s) 124a-b maintained by the database proprietors 106a-b are implemented in a closed platform or walled garden so that untrusted third parties do not have access to the information stored in the database. Among other reasons, database systems implemented in this manner serve to maintain the privacy of the users registered with the database proprietors 106a-b. Maintaining the privacy of individuals represented within the databases of the database proprietors 106a-b is in some tension with the interests of third-party entities (e.g., media providers that may want to target particular individuals (and/or particular demographic segments of a population) with media (e.g., advertisements)), and/or the AME 102 that may want to generate audience metrics (e.g., audience size) based on tracked exposures to the media 114).

In the illustrated example, the database proprietors 106a-b collaborate with the AME 102 so that the AME 102 can operate as an independent party that measures and/or verifies audience measurement information pertaining to the media 114 accessed by the subscribers of the database proprietors 106a-b. However, the database proprietors 106a-b desire to do so while protecting the privacies of their subscribers by not sharing or revealing subscriber identities, subscriber information, and/or any other subscriber PII data to outside parties. In examples disclosed herein, to share impression data with the AME 102 without revealing subscriber identities, subscriber information, and/or any other subscriber PII data, the database proprietors 106a-b process their collected impression data to generate corresponding sketch data 132a-b. In some examples, the sketch data 132a-b is generated by a database proprietor apparatus 800 implemented by the corresponding data base proprietor servers 118a-b. Further detail regarding the database proprietor apparatus 800 is provided below in connection with FIG. 8.

As used herein, sketch data is an arrangement of data for use in massive data analyses. For example, operations and/or queries that are specified with respect to the explicit and/or very large subsets, can be processed instead in sketch space (e.g., quickly (but approximately) from the much smaller sketches representing the actual data). This enables processing each observed item of data (e.g., each logged media impression and/or audience member) quickly in order to create a summary of the current state of the actual data. In some examples, summary statistics or sketch data provide an indication of certain characteristics (e.g., number of impressions of a media item and/or audience reach of the media item) of data in a database without disclosing any personally identifiable information of individual users that may have contributed to the summary statistics.

One type of data structure that is useful to provide summary statistics (e.g., sketch data) in the context of tracking exposure to media is the Bloom filter array. A typical Bloom filter array is a vector or array of bits that are initialized to 0 and then populated by flipping individual ones of the bits from 0 to 1 based on the allocation or assignment of users (or other data entries) in a database (e.g., the databases 124a-b of the database proprietors 106a-b of FIG. 1) to respective ones of the bits in the Bloom filter array. The users (or other data entries) in a database that are represented in the Bloom filter array are identified as corresponding to summary statistics of interest (e.g., users that were exposed to a particular media item). That is, while it would be possible to generate a vector for sketch data of all subscribers of either one of the database proprietors 106a-b, in many instances, the subscribers included in particular sketch data 132a-b may be the subset of all subscribers that corresponds to audience members that accessed and/or were exposed to a particular media item 114 of interest.

Figure 2:
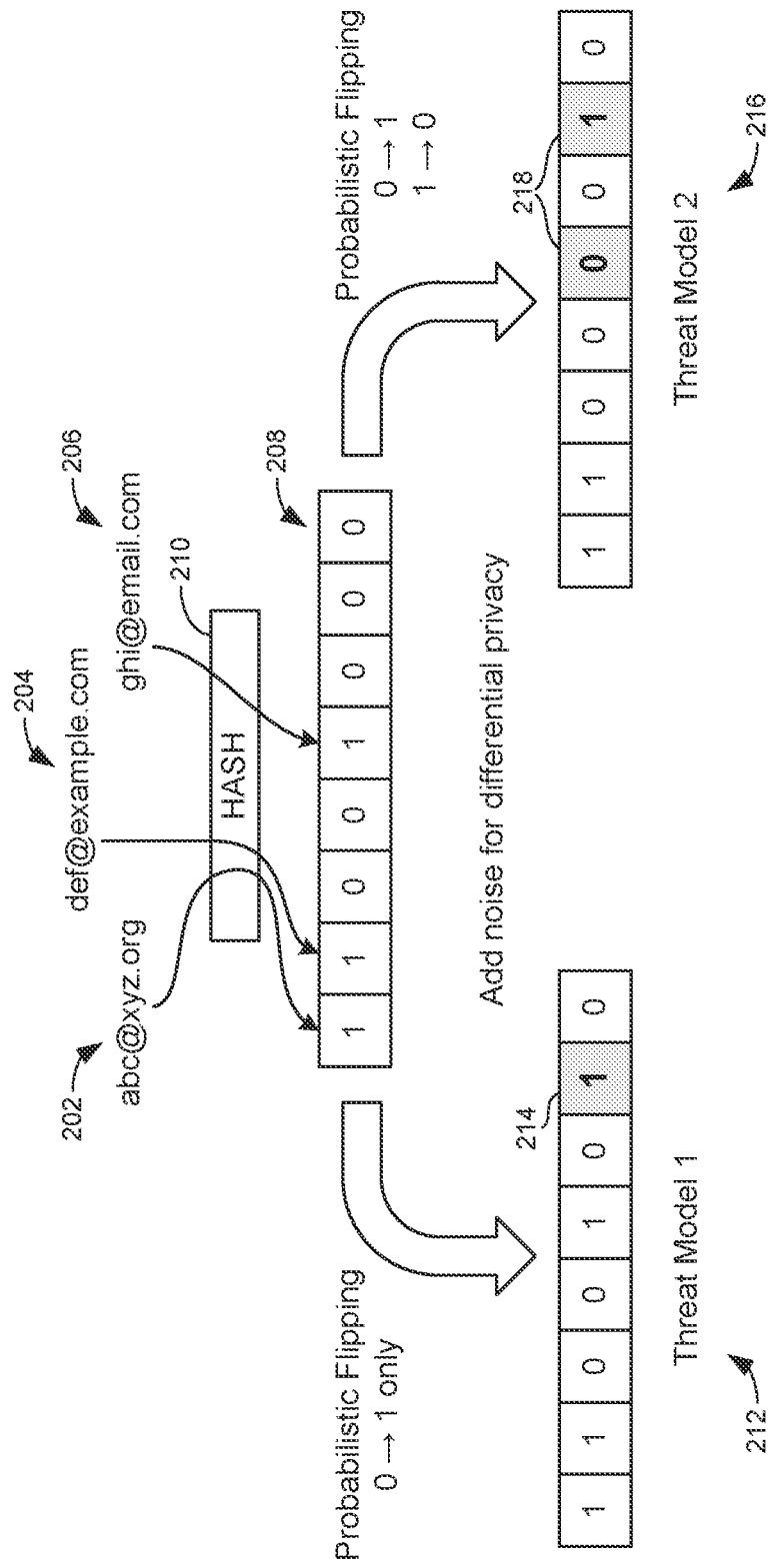
FIG. 2 illustrates the creation of an example Bloom filter array with noise added according to two different threat models.

The process of generating a Bloom filter array representative of three distinct users is demonstrated in connection with FIG. 2. As shown in the illustrated example of FIG. 2, the distinct users are represented by three distinct email addresses 202, 204, 206 that are assigned or allocated to individual bits or elements of an example Bloom filter array 208 having a length of 8 bits or elements. In this example, the Bloom filter array 208 is initialized to have all 0 values that are then flipped to a value of 1 based on the allocation of the users in the underlying data to be represented by the Bloom filter array 208. More particularly, in some examples, the particular bit or element in the Bloom filter array 208 to which a particular user is mapped is based on the output of a hash function 210 of a personal identifier of the user (e.g., the email addresses 202, 204, 206 of FIG. 2). While the email addresses 202, 204, 206 are represented in the figure, any type of PII data could additionally or alternatively be used.

Although one hash function 210 is represented in the illustrated example, in some examples, more than one hash function (e.g., 2, 3, 4, etc.) may be applied to each email address 202, 204, 206 such that each user is allocated or assigned to multiple different elements in the Bloom filter array (e.g., each user is assigned to the same number of elements in the Bloom filter as the same number of hash functions used to assign the users). Whether one or more hash function(s) is/are used, each such hash function 210 is designed to map a particular input (e.g., a particular email address 202, 204, 206) to one and only one element in the Bloom filter array 208.

In some examples, for the sketch data 132a-b (e.g., the Bloom filter array 208) from the separate database proprietors 106a-b to be reliably aggregated and meaningfully analyzed, the particular hash function(s) 210 used by each database proprietors 106a-b need to be agreed upon in advance. Further, the length of the Bloom filter array 208 as generated by each database proprietors 106a-b needs to be the same. Based on these constraints, if a user is a registered subscriber of both database proprietors 106a-b and identified as an audience member of a particular media item 114, then both database proprietors 106a-b will include the user in their respective Bloom filter arrays (e.g., sketch data 132a-b) and the user will be allocated to the same elements in both Bloom filter arrays (e.g., based on the same output of the same hash function used by both database proprietors 106a-b). Inasmuch as hashing functions cannot be reversed, the PII data for the particular audience members is kept private, thereby preserving the anonymity of the underlying raw data represented by the sketch data 132a-b.

As represented in FIG. 2, the three email addresses 202, 204, 206 are respectively allocated to the first, second and fifth elements of the Bloom filter array 208 based on the output of the hash function 210 generated using the email addresses 202, 204, 206 as inputs. As such, the bit value of each of the first, second, and fifth elements in the Bloom filter array 208 are flipped from a 0 (prior to the allocation of the users to the array) to a 1. If a fourth user were allocated to any one of the first, second, or fifth elements in the Bloom filter array 208 (e.g., based on a fourth email address processed through the hash function 210 and mapped to the resulting element), there would be no change to the Bloom filter array 208 because the value of the corresponding element would already be 1. In other words, a value of 0 in a particular element in a Bloom filter array 208 remains a 0 so long as no data entry (e.g., no user) is mapped to that particular element. However, once at least one user is mapped to a particular element the value of the element is flipped to a 1 and remains a 1 regardless of any further assignments of different users to the same element.

As mentioned above, in some examples, each user may be allocated to multiple different elements in the Bloom filter array 208 based on multiple different hash functions. In such situations, it is possible that a single user is allocated to the same element multiple times (e.g., based on two separate hash functions). The mapping of the output of multiple different hash functions to the same element for a single user identifier (e.g., any one of the email addresses 202, 204, 206) is referred to as a hash collision. There is always some probability that a hash collision may occur when multiple hash functions are used. However, the probability of a hash collision may be reduced by increasing the length of the Bloom filter array 208 (e.g., increasing the number of elements in the array to which a user may be allocated). In many applications, the number of elements in a Bloom filter array may number in the hundreds or even in the thousands such that hash collisions are relatively rare. Relatively long Bloom filter arrays also reduce the likelihood of the array becoming saturated. A Bloom filter array becomes saturated when an overly large proportion of the bits are flipped to a value of 1. As mentioned above, once a bit value is flipped to a 1 in a Bloom filter array, the value remains at a value of 1 thereafter. Thus, as the number of users to be represented in a Bloom filter array increases, there will be an ever increasing number of is until (theoretically) all 0s have become 1s. When a Bloom filter array is entirely filled with is (or has an overly large proportion of 1s) it is no longer possible to infer anything from the sketch data. Accordingly, Bloom filter arrays are designed with a sufficient length relative to an expected size of the database to be represented to reduce (e.g., avoid) saturation so that the resulting sketch data remains meaningful and valuable.

While longer Bloom filter arrays reduce the likelihood of hash collisions and reduce the likelihood of saturation occurring, longer Bloom filter arrays can increase memory and reduce the computational efficiency with which the arrays may be analyzed. Furthermore, having Bloom filter arrays that are overly long presents concerns for user privacy. For instance, although the Bloom filter array does not contain any personally identifiable information (PII) data (e.g., the email addresses 202, 204, 206), the flipping of bits from 0 to 1 is based on a hash of such PII data. As such, if a Bloom filter array is sparsely populated because of a relatively large number of elements to which each user may be allocated and/or a relatively small database represented in the Bloom filter array, it is possible that separate users will be mapped to separate elements in the Bloom filter array with no overlap. In such a situation, there may be a loss of privacy if a third-party entity has access to the Bloom filter array and has independent access to the email addresses 202, 204, 206 (or other PII data) used to allocate users to the array and knows the particular hash function(s) used to populate the Bloom filter array 208. In particular, the third party may be able to confirm whether or not a particular user was included in the sketch data represented by the Bloom filter array 208 by regenerating the hashes and mapping the outputs to the Bloom filter array 208 to see whether the corresponding elements have a bit value of 0 or 1. However, this privacy concern is somewhat mitigated for very large databases and/or Bloom filter arrays with short lengths because multiple user are more likely to map to the same element in the Bloom filter array 208. That is, a bit value of 1 in a particular element of the Bloom filter array 208 may correspond to multiple users in a database the Bloom filter array 208 is created to represent such that a third-party entity may only confirm whether it is possible that a particular user is included in the dataset underlying the Bloom filter array 208. Therefore, the length of a Bloom filter array is often defined based on a tradeoff between increasing user privacy (by reducing the vector length) and reducing saturation for more reliable statistics (by increasing the vector length). Notably, if a third-party entity determines that the output of a hash function for a particular user corresponds to an element in the Bloom filter array 208 that has a value of 0, the third-party entity can at least confidently confirm that the particular user is not included in the underlying dataset. Thus, while Bloom filters can generate false positives when testing for dataset membership, false negatives are impossible unless additional steps are taken such as adding noise to the array as discussed further below.

Even though the contents of a database may be summarized by sketch data in the form of a Bloom filter array, the mere fact of including the data associated with a particular user in sketch data for a corresponding database still has the potential to expose the user to a loss of privacy based on differences in the summary statistics depending on whether or not the user information of the particular user is included. Often, summary statistics shared outside of a walled garden (closed platform) system are designed to be differentially private. Summary statistics are differentially private if a third party having access to the summary statistics cannot determine whether the user information of a particular individual was used in generating the summary statistics. Differential privacy is defined mathematically by the concept of $\varepsilon$-differential privacy, which also defines the parameters under which noise must be added to the summary statistics to ensure the resulting summary statistics are differentially private.

Thus, in some examples, to satisfy the requirements of differential privacy, noise is introduced into the Bloom filter array 208 before it is shared with other (e.g., untrusted) entities. More particularly, noise is added to the Bloom filter array 208 by flipping values of different ones of the bits in the array. The particular manner in which the bit values are flipped may depend upon the type of privacy threat model the database proprietors 106a-b seek to prevent. Two example approaches are represented in FIG. 2. A first threat model 212 corresponds to a scenario where an adversary desires to determine that a user with a known identifier (e.g., a known email address 202, 204, 206) was exposed to the media associated with the Bloom filter array 208. In some such examples, randomly selected bits (e.g., the shaded bit 214) in the Bloom filter array 208 having a value of 0 are flipped to 1 with some probability p, but all bits with a value of 1 remain with a value of 1. The random flipping of 0s to 1s ensures that the presence of a single user identifier in the Bloom filter cannot be verified with certainty. A second threat model 216 corresponds to a scenario where an adversary desires to determine that a user with a known identifier (e.g., a known email address 202, 204, 206) either was exposed to the media associated with the Bloom filter array 208 or was not exposed to the media. In some such examples, randomly selected bits (e.g., the shaded bits 218) in the Bloom filter array 208 having a value of 0 are flipped to 1 with some probability p, and randomly selected bits having a value of 1 are flipped to 0 with some probability 1-q. The random flipping of both 0s to 1s and 1s to 0s ensures that neither the presence of nor the absence of a single user identifier in the Bloom filter array can be verified with certainty.

Once a Bloom filter array includes noise to ensure differential privacy, the Bloom filter array may be shared with interested third parties without compromising the privacy of users. Accordingly, in some examples, each of the database proprietors 106a-b of FIG. 1 may provide such Bloom filter arrays to the AME 102 for aggregation and analysis. In some examples, the same media 114 may be accessed by different client devices 108 (associated with different users) via both the database proprietors 106*a-b*. Accordingly, in some such examples, both database proprietors 106*a-b* may generate a corresponding Bloom filter array representing summary statistics of the registered users for each database proprietors 106*a-b* associated with the corresponding client devices 108 that accessed the media 114. Based on the Bloom filter arrays (e.g., the sketch data 132*a-b*) obtained from each of the database proprietors 106*a-b*, the AME 102 may estimate the total number of unique (e.g., deduplicated) individuals that were exposed to the media. That is, the AME 102 may estimate the reach of the media. A challenge in making this determination is that some users registered with the first database proprietor 106*a* may also be registered with the second database proprietor 106*b*. If such users are exposed to the same media via both database proprietors 106*a-b*, both database proprietors would separately report the users' exposure to the media in their respective Bloom filter arrays resulting in a duplicate reporting of the user as an audience member exposed to the media. Furthermore, as described above, the summary statistics contained in the Bloom filter arrays are differentially private such that the AME 102 cannot directly confirm whether a user is included in one, both, or neither Bloom filter array to appropriately resolve the duplication of audience members across different filters.

Figure 3:
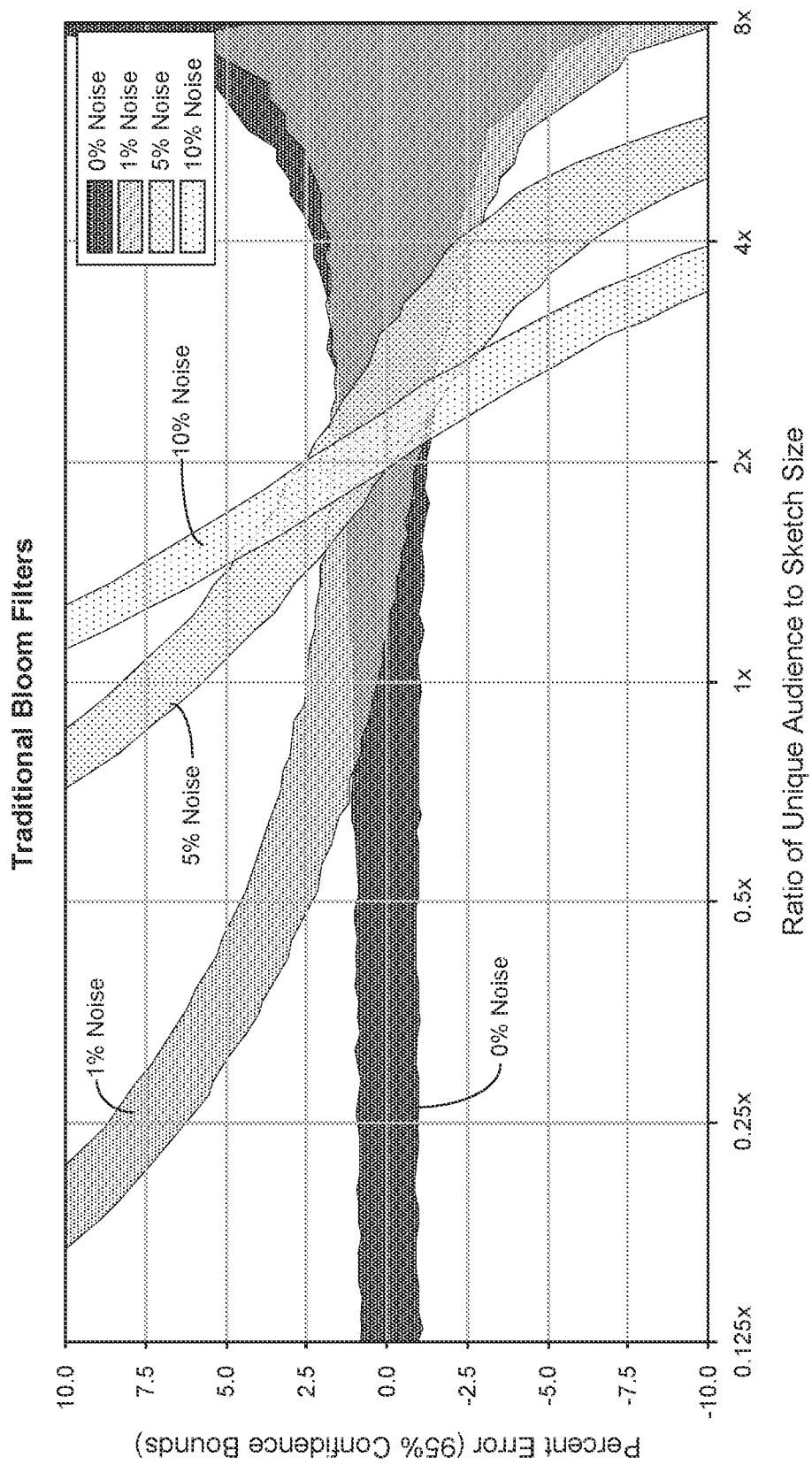
FIG. 3 is a graph illustrating 95% confidence intervals of cardinality estimates for uniformly distributed Bloom filter as a function of the ratio of unique audience size to Bloom filter array length.

Examples disclosed herein enable the estimation of the total number of unique (deduplicated) individuals represented across multiple Bloom filter arrays. This process is sometimes referred to as estimating the cardinality of the union of the Bloom filter arrays. One challenge with cardinality estimates for Bloom filter arrays is that accurate results are very sensitive to the ratio of the unknown cardinality to the size (e.g., length) of the Bloom filter array. If the ratio is too low (e.g., the number of unique audience members represented in the Bloom filter array is small relative to the length of the filter), the signal to noise of the sketch drops to a level that makes cardinality estimations unreliable. That is, where there are relatively few people represented in a Bloom filter array, the amount of noise added to satisfy the requirements of differential privacy may make any inference of the actual data difficult. On the other hand, if the ratio is too high (e.g., the number of unique audience members represented in the Bloom filter array is large relative to the length of the filter), the Bloom filter array becomes saturated (e.g., an overly large proportion of the bits are flipped to a value of 1) making any estimate of the cardinality unreliable. This is represented in FIG. 3, which illustrates the 95% confidence intervals of the cardinality estimates as a function of the ratio of unique audience size (e.g., number of individuals represented in a Bloom filter array) to Bloom filter array length. As shown from FIG. 3, there is a relatively narrow band where the ratio of audience size to Bloom filter array size has a relatively small percentage of error. More particularly, while the percent error is relatively small when there is no noise with ratios of audience size to array lengths up to about 4, the error begins to explode after that. Furthermore, as the amount of noise increases, the range of suitable ratios of audience size to array length narrows considerably to ratios around approximately 2:1. The audience size is a function of the nature of the population targeted for the media and, therefore, cannot be modified. Thus, to maintain accurate estimations of cardinality, the length of the Bloom filter array needs to be adapted to the particular size of the expected audience to be represented by the Bloom filter array. This presents a significant problem when seeking to combine summary statistics from different database proprietors 106*a-b*, particularly where the size of their databases are significantly different.

Figure 4:
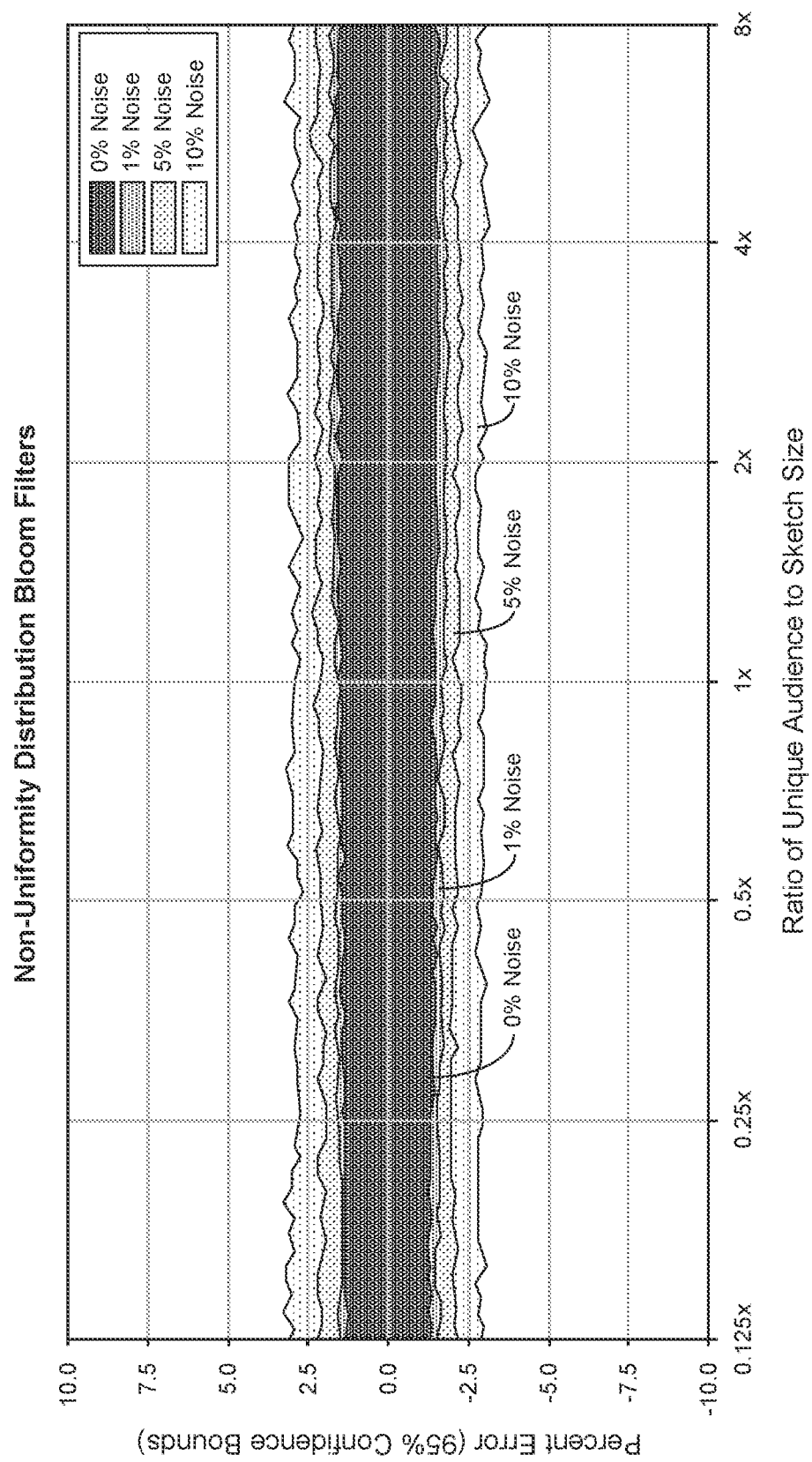
FIG. 4 is a graph illustrating 95% confidence intervals of cardinality estimates for a geometrically distributed Bloom filters as a function of the ratio of unique audience size to Bloom filter array length.

Notably, the above challenge with estimating the cardinality arises in the context of traditional Bloom filter arrays based on a uniform distribution. That is, the mapping of the output of hash functions to particular bits in a Bloom filter array is typically based on a uniform distribution across the different bits of the array. In other words, the probability that the output of a hash 210 of a particular user identifier will map to any given bit in the Bloom filter array 208 is the same as any other bit in the Bloom filter array. However, examples disclosed herein may involve Bloom filter arrays that are allocated based on an arbitrary (e.g., non-uniform) distribution. Arbitrarily distributed Bloom filter arrays offer an alternative solution to standard (uniformly distributed) Bloom filter arrays by providing options for compact data storage. That is, non-uniform Bloom filter arrays can represent the same amount of data with a smaller array length than a traditional (uniform) Bloom filter array because the non-uniform distribution reduces the likelihood of the Bloom filter array becoming saturated (e.g., with too many bits flipped to a 1). As such, examples disclosed herein reduce memory requirements and the associated processing requirements to process the data relative to traditional Bloom filter arrays in use today. Furthermore, arbitrarily distributed Bloom filter arrays increase (e.g., maximize) the information content of the Bloom filter array, such that reliable cardinality estimates can be made across very large spans of audience sizes (e.g., 1000s of users to 100s of millions of users). That is, in contrast with the graph shown in FIG. 3, the graph of FIG. 4 illustrates the 95% confidence intervals of the cardinality estimates for geometrically distributed Bloom filter arrays as a function of the ratio of unique audience size (e.g., number of individuals represented in a Bloom filter array) to Bloom filter array length. As can be seen, the error remains considerably less than 5% for any value of the ratio of audience size to array length ranging from 0.125 to 8. Similarly, the error remains less than 5% for any amount of noise ranging from no noise (0% noise) up to at least 10% noise.

Figure 5:
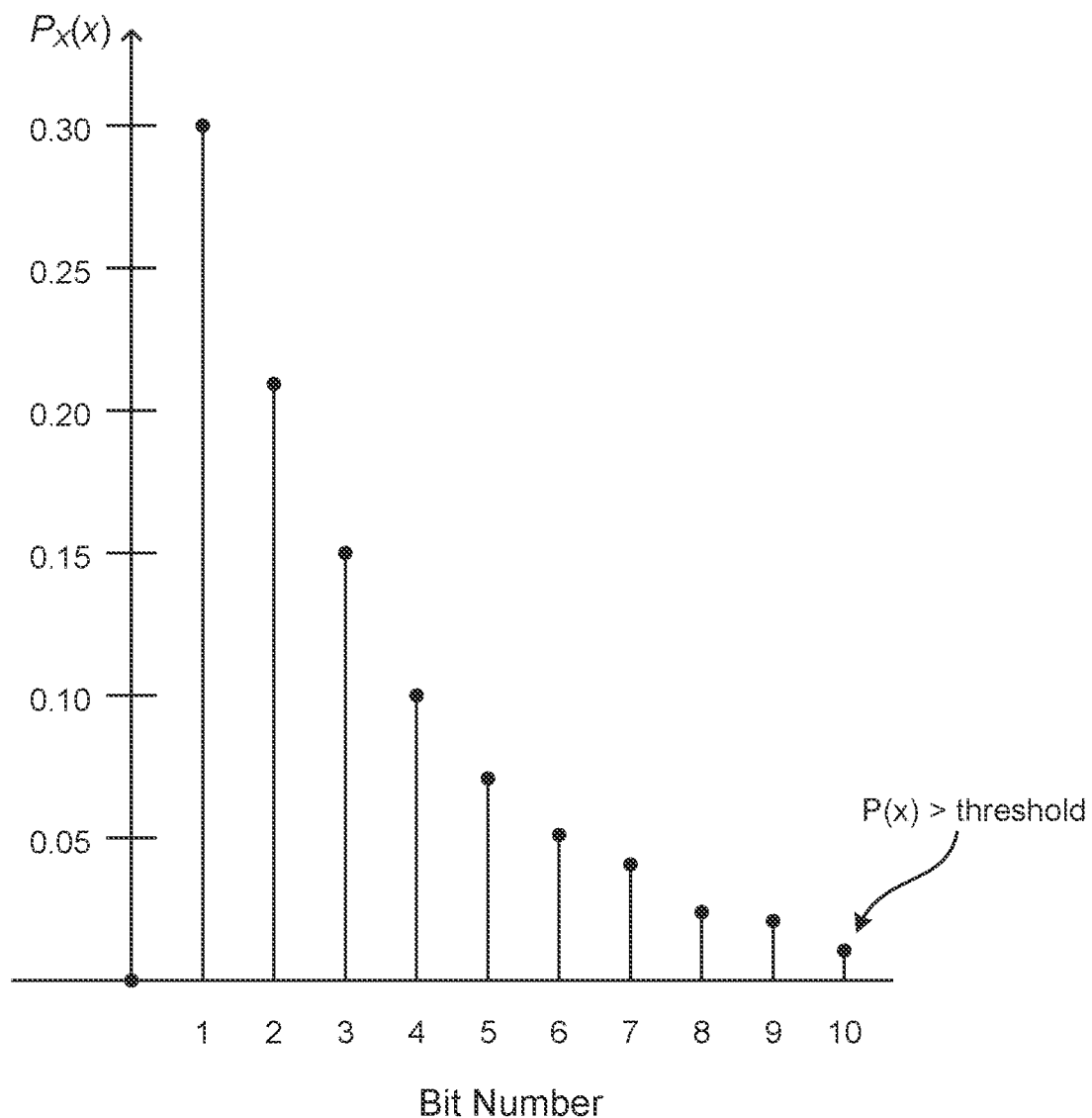
FIG. 5 illustrates an example geometric distribution that may be used to generate an example Bloom filter array in accordance with teachings disclosed herein.

As mentioned above, in some examples, the output of a hash function maps to particular bits of a Bloom filter array based on a geometric distribution. An example geometric distribution for a 10-bit array is shown in FIG. 5. As shown in FIG. 5, the first (e.g., leftmost) bit in the Bloom filter array has the highest probability of mapping a hash function output, with the probability decreasing for each subsequent bit in the vector defining the Bloom filter array. In some examples, the lowest probably for any one of the bits (e.g., the rightmost bit when geometrically distributed) is defined to be greater than or equal to a threshold value determined based on the universe estimate (e.g., the total number of possible audience members that may be exposed to the media). More particularly, in some examples, the probability threshold is defined as 1 over the universe estimate multiplied by a factor of safety (e.g., 1/(UE×FS)). Thus, in some examples, if the universe estimate (UE) is 100 million people and the factor of safety (FS) is 2, the probability of a hash function output being assigned to the rightmost bit of a geometrically distributed Bloom filter array is defined to be at least 1/200 million. In some examples, the factor of safety may be 1 or any suitable value greater than 1. Distributing outputs of a hash function across the bits of a Bloom filter array according to a geometric distribution as shown in FIG. 5 will result in the left hand side of the Bloom filter array being relatively saturated (e.g., many of the bits towards the left hand side will be flipped to 1) with the right hand side of the Bloom filter array being sparsely populated (e.g., relatively few bits flipped to 1). While the geometric distribution is defined for some example Bloom filter arrays, examples disclosed herein may be implemented using any suitable probability distribution.

Figure 6:
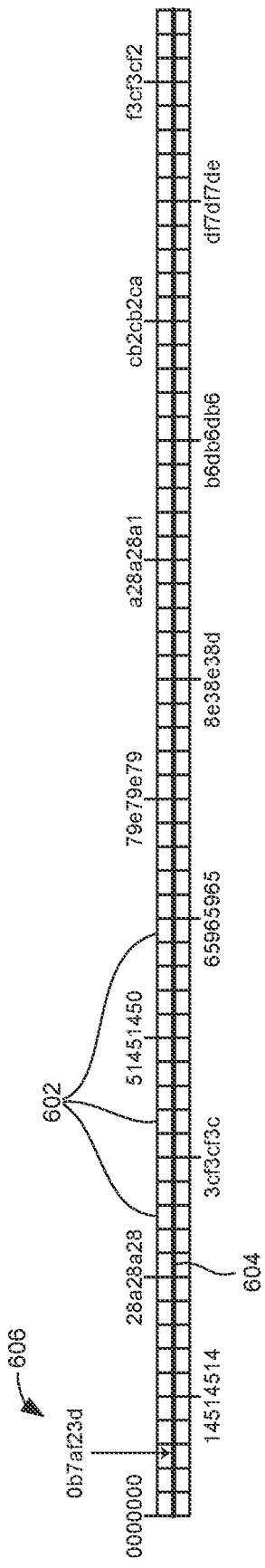
FIG. 6 illustrates an example uniformly distributed Bloom filter.
Figure 7:
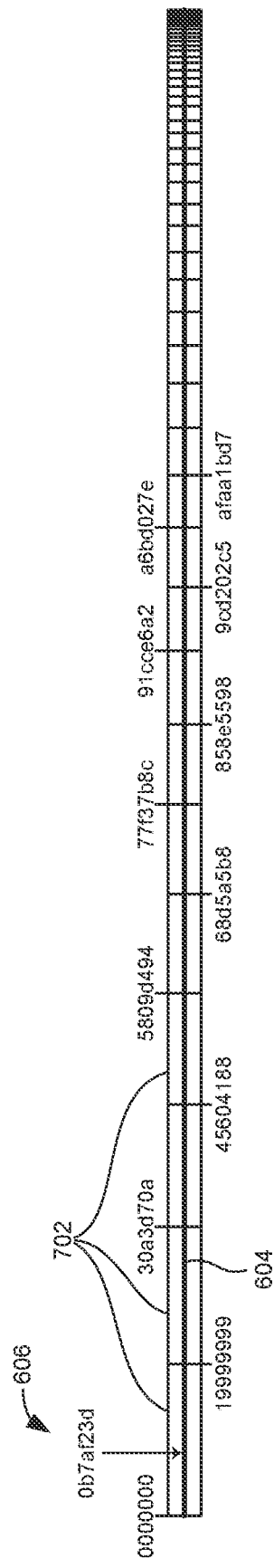
FIG. 7 illustrates an example geometrically distributed Bloom filter.

The difference in mapping of a hash function to a uniformly distributed Bloom filter array relative to a geometrically distributed Bloom filter array is graphically represented with reference to FIGS. 6 and 7. In the illustrated example of FIG. 6, a row of boxes 602 are arranged along a linear scale 604 of values corresponding to potential outputs of a particular hash function (e.g., the hash function 210 of FIG. 2). Similarly, in FIG. 7, a row of boxes 702 are arranged along the same linear scale 604. In both FIGS. 6 and 7, each box 602, 703 corresponds to a different element in a Bloom filter array. Thus, the width of each box 602, 702 along the scale 604 defines the range of values output by the hash function 210 that map to the same element in the Bloom filter array. FIG. 6 illustrates a uniformly distributed Bloom filter array because each box 602 has the same width such that the same number of potential outputs of the hash function 210 will map to any given element in a Bloom filter array (corresponding to each different box 602). By contrast, FIG. 7 illustrates a geometrically distributed Bloom filter array because the boxes 702 differ in size with the largest box 702 at the left end of the scale 604 and getting smaller as the location on the scale 604 moves to the right.

For purpose of explanation, the same hash output 606 is shown mapped at the same position along the scale 604 in both FIGS. 6 and 7. As can be seen, the hash output 606 is within the third box 602 in FIG. 2 such that the output maps to the third bit in the uniformly distributed Bloom filter array. By contrast, in the illustrated example of FIG. 7, the hash output 606 is within the first box 702 and, therefore, maps to the first bit in the uniformly distributed Bloom filter array. More generally, it can be seen that a hash output falling within any one of the first six boxes 602 in FIG. 6 would all fall within the first box 702 of FIG. 7. Notably, in the illustrated examples of FIGS. 6 and 7, the mapping of a hash output to a particular element of a Bloom filter array is based on the location of the hash output on the linear scale 604 of all potential output values. However, the outputs of a hash function may be mapped to different bits based on other algorithm and/or processing applied to the hash function output to produce the desired distribution. For instance, a cumulative distribution may be defined with different values from 0 to 1 that corresponds to the desired distribution of hash outputs to the elements of a Bloom filter array. In such examples, the hash function or a portion of the hash function (e.g., the left-most five bits) may be converted to a decimal expression between 0 and 1 and mapped to the cumulative distribution to then be mapped to the corresponding element of the Bloom filter array.

Examples disclosed herein enable the AME 102 to estimate the cardinality of a unioned set of Bloom filter arrays by numerically solving for the value of users (e.g., cardinality) that would result in the maximum likelihood of producing the unioned set of Bloom filter arrays based on known parameters of the arrays. In particular, in some examples, the known parameters include the type and/or number of hash function(s) used to map users to the Bloom filter arrays, the length (e.g., number of bits or elements) of the Bloom filter arrays, and the parameters defining the distribution of the hash function(s) outputs to particular elements of the Bloom filter arrays. That is, in some examples, for the cardinality estimation to be reliable, the database proprietors 106*a*-*b* that generate the Bloom filter arrays and the AME 102 agree to use the same hash function(s) to generate each Bloom filter array, the same length of Bloom filter array, and the same distribution of the hash function outputs for the Bloom filter array. Further, in some examples, the database proprietors 106*a*-*b* provide the noise parameters (e.g., probability p of flipping a 0 to a 1, and the probability 1—q of flipping a 1 to a 0). In some examples, the noise parameters may be the same across different Bloom filter arrays. However, in other examples, the noise parameters may be different between different Bloom filter arrays (e.g., the values used for p and q by the first database proprietor 106*a* may be different than the values used for p and q by the second database proprietor 106*b*).

The mathematical principles underlying the ability to estimate the cardinality of users represented in Bloom filter arrays can be expressed generally for any Bloom filter array $B=\{1, \ldots, m\}$, $m \geq 1$, with all values initialized to 0 and then individually flipped to 1 based on the allocation of n unique data entries (e.g., users exposed to media) across a database (e.g., the databases 124*a*-*b*) using a hash function with outputs that follow a discrete distribution on the set $\{1, \ldots, m\}$. Let $p_k$ be the probability mass function of the hash function. That is, the probability that $h_1(x)=k$ (with $k \geq 1$) for any randomly picked element x equals $Pr(h_1(x)=k)=p_k$.

After the n allocations of the data entries to the Bloom filter array (B), the probability that the $k^{th}$ element in B is still zero (e.g., no data entry has been allocated to the element) is $Pr(B_k=0)=(1-p_k)^n$. Thus, the probability that the $k^{th}$ element in B was flipped to 1 (e.g., at least one data entry was allocated to the element) is $Pr(B_k=1)=1-Pr(B_k=0)$. If the hash function follows a uniform distribution on $\{1, m\}$, then $p_k=1/m$ and $Pr(B_k=0)=(1-1/m)^n$. If the hash function follows a geometric distribution with parameter $p=\frac{1}{2}$, then $p_k=2^{-k}$ and $Pr(B_k=0)=(1-2^{-k})^n$. For notational convenience, let $$p_k^{(n)} = 1-(1-p_N)^n \qquad \text{Eq. 1}$$

Equation 1 represents the probability the $k^{th}$ element in B would be equal to 1 after n allocations, where the probability of any one of the n allocations mapping to that element is $p_k$. In other words, by definition, $Pr(B_k=1)=p_k^{(n)}$ after the n allocations. Notably, by subtracting 1 from both sides of Equation 1, the notation highlights the contribution of the n term to both sides:

$$1-p_k^{(n)} = (1-p_k)^n \qquad \text{Eq. 2}$$

Before the Bloom filter array B is to be shared with third parties (e.g., the AME 102), noise may be added to establish differential privacy. In some examples, the noise may be added using two different approaches including a permanent randomized response approach and an instantaneous randomized response approach. In the permanent randomized approach a binary reporting value $b_i'$ is created for each value (e.g., 0 or 1) and each bit i in B such that the binary reporting value is equal to $$B_i' = \begin{cases} 1, & \text{with probability } \frac{1}{2}f \\ 0, & \text{with probability } \frac{1}{2}f \\ B_i, & \text{with probability } 1-f \end{cases} \qquad \text{Eq. 3}$$

The instantaneous randomized response approach followed the permanent randomized approach and involves a bit array S of size m is created and each bit i in S is set with probabilities $$Pr(S_i=1) = \begin{cases} q, & \text{if } B'_i = 1 \\ p, & \text{if } B'_i = 0 \end{cases} \qquad \text{Eq. 4}$$

The array S corresponds to the final Bloom filter array with noise added that may be shared with third party entities without privacy concerns.

Both the permanent randomized response approach and the instantaneous randomized response approach involve flipping some bits from 0 to 1 and/or flipping some bits from 1 to 0 at particular probabilities. Accordingly, the two approaches may be combined into two equalities defining the probability that an element with the value of 1 before adding noise ends up with (e.g., remains with) a value of 1 after adding noise (q') and defining the probability that an element with a value of 0 before adding noise ends up with (e.g., is flipped to) a value of 0 after adding noise (p'):

$$q' = Pr(S_i = 1 | B_i = 1) = \frac{1}{2}f(p+q) + (1-f)q \qquad \text{Eq. 5}$$

$$p' = Pr(S_i = 1 | B_i = 0) = \frac{1}{2}f(p+q) + (1-f)p \qquad \text{Eq. 6}$$

Equations 5 and 6 may be generalized in that the values of $\{f, p, q\}$ can be indexed by k, which would result in the general probabilities of $\{q^{k'}, p^{k'}\}$. For the sake of clarity, the following discussion and associated equations are provided using the notation of q' and p' without the k subscript. However, the following discussion and associated formulas would still be valid if the subscript of k was added to the q' and p' terms throughout.

In some examples, the number of n allocations added to the Bloom filter array B (e.g., the cardinality of the Bloom filter array) based on the available array S, which includes the addition of noise may be estimated by determining the likelihood function. In general, $$\begin{aligned} Pr(S_k = 0) &= Pr(S_k = 0 | B_k = 0)Pr(B_k = 0) + \\ &\quad Pr(S_k = 0 | B_k = 1)Pr(B_k = 1) \\ &= (1 - p')\left(1 - p_k^{(n)}\right) + (1 - q')\left(p_k^{(n)}\right) \\ &= (1 - p') + p_k^{(n)}(p' - q') \end{aligned} \qquad \text{Eq. 7}$$

$$\begin{aligned} Pr(S_k = 1) &= Pr(S_k = 1 | B_k = 0)Pr(B_k = 0) + \\ &\quad Pr(S_k = 1 | B_k = 1)Pr(B_k = 1) \\ &= (p')\left(1 - p_k^{(n)}\right) + (q')\left(p_k^{(n)}\right) \\ &= p' - p_k^{(n)}(p' - q') \end{aligned} \qquad \text{Eq. 8}$$

As shown in Equations 7 and 8, $Pr(S_k=0)+Pr(S_k=1)=1$ for all k. Thus, if p'=q', then p'-q'=0, which would cancel out the dependence on n within $p_k^{(n)}$ such that no inference on n is possible. Accordingly, in examples disclosed here, a constraint for the addition of noise to the Bloom filter arrays is that p'≠q'. With this as a constraint, the general likelihood equation is $$\mathcal{L}(n|S) = \prod_{k=1}^{m} Pr(S_k = 1)^{S_k} Pr(S_k = 0)^{1-S_k} \qquad \text{Eq. 9}$$

Figure 9:
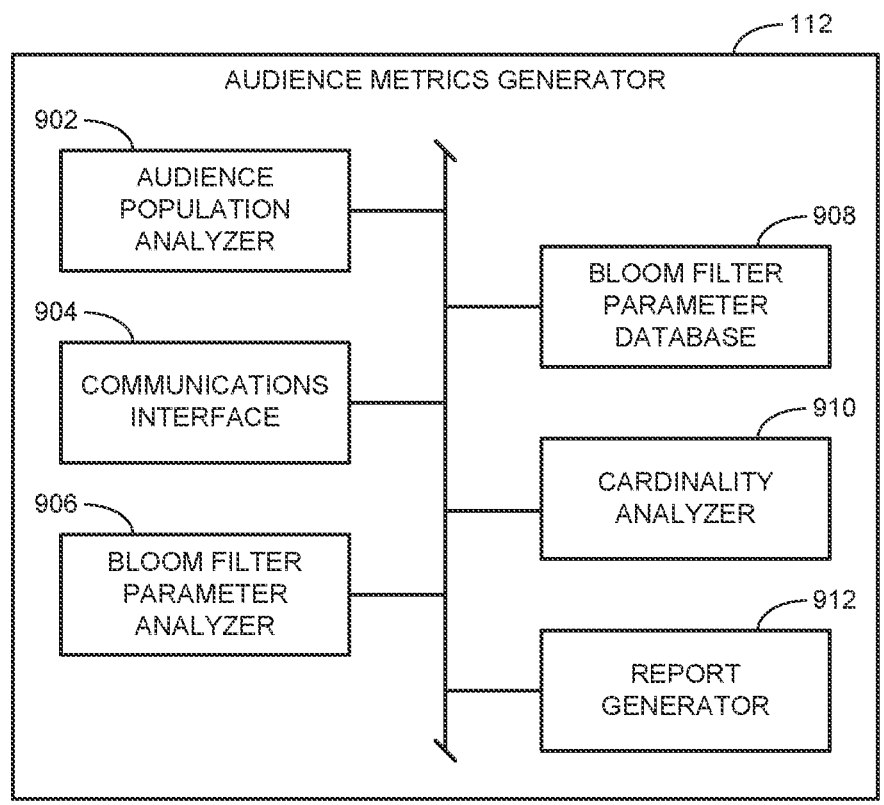
FIG. 9 is a block diagram of an example implementation of the example audience metrics generator of the audience measurement entity of FIG. 1.

Significantly, as shown in FIG. 9, the product operator goes from k=1 to k=m. This means that the likelihood function considers all values of all elements in the Bloom filter array as well as the position of such values in the array. This is a considerable improvement over some existing methodologies to estimate the cardinality of Bloom filter arrays because the existing methodologies are limited to considering only a set number of leading bits in the arrays and/or a set number of trailing bits in the arrays. By taking the values of all bits in the arrays (e.g., both leading bits and trailing bits), the estimation of cardinality is more reliable because it is based on more information than other existing approaches.

With no differential noise (e.g., $f=0$, $p=0$, $q=0$) the probabilities defined in Equations 5 and 6 become $$q'=Pr(S_k=1|B_k=1)=1 \qquad \text{Eq. 10}$$

$$p'=Pr(S_k=1|B_k=0)=0 \qquad \text{Eq. 11}$$

and the probabilities defined in Equations 7 and 8 become $$Pr(S_k=0)=1-p_k^{(n)} \qquad \text{Eq. 12}$$

$$Pr(S_k=1)=p_k^{(n)} \qquad \text{Eq. 13}$$

Substituting Equations 12 and 13 into Equation 9 yields the following likelihood $$\mathcal{L}(n|S) = \prod_{k=1}^{m} \left(p_k^{(n)}\right)^{S_k} \left(1 - p_k^{(n)}\right)^{1-S_k} \qquad \text{Eq. 14}$$

With noise being added according to the first threat model 212 represented in FIG. 2 in which 0s may be flipped to 1s but all 1s remain 1s (e.g., $f=0$, $q=1$, and p is variable) the probabilities defined in Equations 5 and 6 become $$q'=Pr(S_k=1|B_k=1)=1 \qquad \text{Eq. 15}$$

$$p'=Pr(S_k=1|B_k=0)=P \qquad \text{Eq. 16}$$

and the probabilities defined in Equations 7 and 8 become (with the second lines based on the identity set forth in Equation 2)

$$\begin{aligned} Pr(S_k = 0) &= (1-p)\left(1 - p_k^{(n)}\right) \\ &= (1-p)(1-p_k)^n \end{aligned} \qquad \text{Eq. 17}$$

$$\begin{aligned} Pr(S_k = 1) &= 1 - Pr(S_k = 0) \\ &= 1 - (1-p)(1-p_k)^n \end{aligned} \qquad \text{Eq. 18}$$

where the second line in each of Equations 17 and 18 is based on the identity set forth in Equation 2. Equation 17 represents the idea that, in order for a given element of the Bloom filter array to have a 0, there must not have been any allocations to that given element and also that the 0 value is not flipped to a 1 after the allocations. Equation 18 makes more sense if re-written as follows:

$$\begin{aligned} Pr(S_k = 1) &= 1 - \left((1-p)\left(1 - p_k^{(n)}\right)\right) \\ &= p_k^{(n)} + p\left(1 - p_k^{(n)}\right) \end{aligned} \qquad \text{Eq. 19}$$

Equation 19 represents the idea that there are two ways a given element of the Bloom filter array ends up with a value of 1 including (1) at least one of the n allocations was mapped to the given element with a probability of $p_k^{(n)}$, and (2) the element was never assigned during the allocations but the 0 value was flipped to a 1 when noise was added with a probability of p. Substituting Equations 17 and 18 into Equation 9 yields the following likelihood $$\mathcal{L}(n|S) = \prod_{k=1}^{m}(1-(1-p)(1-p_k)^n)^{S_k}((1-p)(1-p_k)^n)^{1-S_k} \quad \text{Eq. 20}$$

Equations 5-20 define the probabilities for the 0s and 1s in a single Bloom filter array and the corresponding likelihood function for the cardinality of the array when there is either no noise or partial noise (e.g., noise added based on the first threat model 212). As discussed above, in some examples, the AME 102 may receive different Bloom filter arrays from different database proprietors 106a-b. In some instances, there may be overlap in the users represented in the separate Bloom filter arrays such that an estimate of the cardinality for each separate Bloom filter cannot be used to directly determine the cardinality of the union of the separate arrays (e.g., the deduplicated audience size across all Bloom filter arrays). That is, in the situation where there are two Bloom filter arrays generated based on two different datasets (e.g., one from each of the two database proprietors 106a-b), there are three mutually exclusive partitions that can be estimated to determine the overall cardinality across both arrays. In particular, the three mutually exclusive partitions include (1) the number $n_{10}$ of users in the first dataset but not the second dataset, (2) the number $n_{01}$ of users in the second dataset but not the first dataset, and (3) the number $n_{11}$ of users in both the first dataset and the second dataset. The size or cardinality for the first dataset is $n_{10}+n_{11}$, whereas the size of the second dataset is $n_{01}+n_{11}$. The intersection of the two datasets is $n_{11}$, and their union (corresponding to the overall cardinality across both datasets) is $n_{01}+n_{10}+n_{11}$.

As discussed above, for a single Bloom filter array based on a single underlying dataset, the probability that a given element in the array has the value of 1 after n allocations is $Pr(B_k=1)=p_k^{(n)}$. In the situation where there are two Bloom filter arrays, the corresponding probability for each array may be expressed as follows $$Pr(B_k^{(1)}=1)=p_k^{(n_{10}+n_{11})} \quad \text{Eq. 21}$$

$$Pr(B_k^{(2)}=1)=p_k^{(n_{01}+n_{11})} \quad \text{Eq. 22}$$

Significantly, the probabilities of Equations 21 and 22 are not independent in that $$Pr(B_k^{(1)}=i \text{ and } B_k^{(2)}=j) \neq Pr(B_k^{(1)}=i)Pr(B_k^{(2)}=j) \quad \text{Eq. 23}$$

because the users within $n_{11}$ are assigned identically across both Bloom filter arrays. That is, if one of the users in $n_{11}$ is assigned to a particular element in the Bloom filter array generated by the first database proprietor 106a, then it is guaranteed that the same user will also be assigned to the corresponding element in the Bloom filter array generated by the second database proprietor 106b. In other words, for a given user within $n_{11}$, corresponding elements in both Bloom filter arrays are either both assigned a value of 1 or both remain with a value of 0 during the allocation of the users. As such, the joint distribution between two arrays must be determined taking this correlation into account as represented by the following:

$$Pr(B_k=(0,0))=(1-p_k^{(n_{10})})(1-p_k^{(n_{01})})(1-p_k^{(n_{11})})$$

$$Pr(B_k=(1,0))=(p_k^{(n_{10})})(1-p_k^{(n_{01})})(1-p_k^{(n_{11})})$$

$$Pr(B_k=(0,1))=(1-p_k^{(n_{10})})(1-p_k^{(n_{01})})(1-p_k^{(n_{11})})$$

$$Pr(B_k=(1,1))=1-Pr(B_k=(0,0))-Pr(B_k=(1,0))-Pr(B_k=(0,1)) \quad \text{Eq. 24}$$

where the notation $Pr(B_k=(X,Y))$ is shorthand for $Pr(B_k^{(1)}=X \text{ and } B_k^{(2)}=Y)$. The four above expressions in Equation 24 define the probabilities of the four different possible outcomes for any given element in both Bloom filter arrays. As an example, the only way to yield (1,0) for a given element in both Bloom filter arrays (e.g., where the value of element in the first array is 1 and the value of the corresponding element in the second array is 0) is if none of the users within the $n_{11}$ set were allocated to the given element, with probability $(1-p_k^{(n_{11})})$, and also that none of the users unique to the second dataset (e.g., within the not partition) are allocated to the given element, with probability $(1-p_k^{(n_{01})})$. However, at least one user among those unique to the first dataset (e.g., within the nib set) is allocated to the given element, with probability $p_k^{(n_{10})}$.

Inasmuch as noise is achieved at the bit-level (e.g., individual bit values are flipped between 0 and 1), the expressions for the noise terms do not depend on the particular Bloom filter array involved even if the noise terms differ from one filter to another. That is, the expressions for q' and p' outlined in Equations 5 and 6 are still valid such that if the parameters {f, p, q} are the same across the multiple Bloom filter arrays based on different datasets, the equations may be expressed as $$q' = Pr(S_k^{(j)}=1|B_k^{(j)}=1) \text{ for each array } j \quad \text{Eq. 25}$$
$$= \frac{1}{2}f(p+q)+(1-f)q$$

$$p' = Pr(S_k^{(j)}=1|B_k^{(j)}=0) \text{ for each array } j \quad \text{Eq. 26}$$
$$= \frac{1}{2}f(p+q)+(1-f)p$$

The joint distribution between the two Bloom filter arrays is now what matters to estimate the overall cardinality across both datasets underlying the two arrays. Similar to before, let the notation $Pr(S_k=(X,Y))$ is shorthand for $Pr(S_k^{(1)}=X \text{ and } S_k^{(2)}=Y)$. Considering all possible combinations across the two datasets yields $$Pr(S_k=(0,0))=Pr(B_k=(0,0))Pr(S_k^{(1)}=0|B_k^{(1)}=0)Pr(S_k^{(2)}=0|B_k^{(2)}=0)+$$

$$Pr(B_k=(0,1))Pr(S_k^{(1)}=0|B_k^{(1)}=0)Pr(S_k^{(2)}=0|B_k^{(2)}=1)+$$

$$Pr(B_k=(1,0))Pr(S_k^{(1)}=0|B_k^{(1)}=1)Pr(S_k^{(2)}=0|B_k^{(2)}=0)+$$

$$Pr(B_k=(1,1))Pr(S_k^{(1)}=0|B_k^{(1)}=1)Pr(S_k^{(2)}=0|B_k^{(2)}=1) \quad \text{Eq. 27}$$

As a specific example, one scenario that would result in $S_k=(0,0)$ for a given element is if the element in the first Bloom filter array was originally 0 (no users assigned to the element) and the element in the second Bloom filter array was originally 1 (at least one user assigned to the element), with a joint probability $Pr(B_k=(0,1))$, and the element in the second Bloom filter array was bit-flipped (back to 0) due to noise.

Similar expressions to Equation 27 can be written for the other three combinations of joint values (e.g., (1,0), (0,1), and (1,1)). Such equations may then be simplified using the previous equations outlined above to yield $$Pr(S_k=(0,0))=(1-p_k)^{(n_{10}+n_{11})}(p'-q')(-1+(1-p_k)^{n_{10}}(p'-q')+q')+$$

$$(-1+q')(-1+(1-p_k)^{(n10+n11)}(p'-q')+q') \qquad \text{Eq. 28}$$

$$Pr(S_k=(1,0))=(1-p_k)^{(n01+n11)}(p'-q')((1-p_k)^{n10}(p'-q')+q')+$$

$$(-1+q')(-q'+(1-p_k)^{(n10+n11)}(-p'+q')) \qquad \text{Eq. 29}$$

$$Pr(S_k=(0,1))=(1-p_k)^{(n10+n11)}(p'-q')((1-p_k)^{n01}(p'-q')+q')+$$

$$(-1+q')(-q'+(1-p_k)^{(n01+n11)}(-p'+q')) \qquad \text{Eq. 30}$$

$$Pr(S_k=(1,1))=(q')^2+(1-p_k)^{n11}(p'-q')(1-p_k)^{n01}q'+$$

$$(1-p_k)^{n10}((1-p_k)^{n01}(p'-q')+q')) \qquad \text{Eq. 31}$$

The sum across the four combinations of probabilities expressed in Equations 28-31 totals to 100% for all k. As before, if p'=q', the dependence on the individual cardinalities of the different partitions (e.g., $n_{10}$, $n_{01}$, $n_{11}$) cancel out such that no inference on any cardinality is possible. Accordingly, as noted above, a constraint is set in place such that p'≠q'. With these aspects of the system established, the general likelihood equation is $$\mathcal{L}(n_{10}, n_{01}, n_{11}|S) = \prod_{k=1}^{m} Pr(S_k = (0, 0))^{[S_k=(0,0)]} \times \qquad \text{Eq. 32}$$

$$Pr(S_k = (1, 0))^{[S_k=(1,0)]} \times$$

$$Pr(S_k = (0, 1))^{[S_k=(0,1)]} \times$$

$$Pr(S_k = (1, 1))^{[S_k=(1,1)]}$$

where [A] is the Iverson bracket defined as $$[A] = \begin{cases} 1 & \text{if } A \text{ is true} \\ 0 & \text{otherwise} \end{cases} \qquad \text{Eq. 33}$$

With no differential noise being added in either Bloom filter array (e.g., $f=0$, $p=0$, $q=0$), the probabilities defined in Equations 25 and 26 become $$q'=Pr(S_k=1|B_k=1)=1 \qquad \text{Eq. 34}$$

$$p'=Pr(S_k=1|B_k=0)=0 \qquad \text{Eq. 35}$$

and the probabilities defined in Equations 28-30 become $$Pr(S_k=(0,0))=(1-p_k)^{(n01+n10+n11)} \qquad \text{Eq. 36}$$

$$Pr(S_k=(1,0))=(1-(1-p_k)^{n10})(1-p_k)^{(n01+n11)} \qquad \text{Eq. 37}$$

$$Pr(S_k=(0,1))=(1-(1-p_k)^{n01})(1-p_k)^{(n01+n11)} \qquad \text{Eq. 38}$$

with $Pr(S_k=(1,1))$ equal to 1 minus the sum of Equations 36-38. Equations 36-38 may be simplified using the identity defined in Equation 2 to yield $$Pr(S_k=(0,0))=1-p_k^{(n01+n10+n11)} \qquad \text{Eq. 39}$$

$$Pr(S_k=(1,0))=(p_k^{(n10)})(1-p_k^{(n01+n11)}) \qquad \text{Eq. 40}$$

$$Pr(S_k=(0,1))=(p_k^{(n01)})(1-p_k^{(n10+n11)}) \qquad \text{Eq. 41}$$

The above Equations indicate, for example, that for corresponding elements in both Bloom filter arrays to have a value of 0 (e.g., 0,0), none of the users within any set of $\{n_{01}, n_{10}, n_{11}\}$ can be allocated to the corresponding elements. Similarly, for (1,0), at least one user in $n_{10}$ needs to be allocated to the relevant element in the first Bloom filter array, but no user in either not or $n_{11}$ can be allocated to the corresponding element in either the first or second Bloom filter arrays.

The likelihood function for the overall cardinality of two Bloom filter arrays where neither array includes noise is the same as the general likelihood function defined in Equations 32 and 33. However, in this scenario where two Bloom filter arrays with no noise are being analyzed, Equations 39-41 are substituted into Equation 32. Thus, the cardinality of two Bloom filter arrays with no noise may be estimated by first numerically solving for the values of $n_{10}$, $n_{01}$, and $n_{11}$ that maximize the likelihood function of Equation 32 with Equations 39-41 substituted therein. Once the values of $n_{10}$, $n_{01}$, and $n_{11}$ have been solved for, the overall estimate of the cardinality for the unioned arrays corresponds to the sum of those values. Notably, if $p_k$ is independent of k, such as for a uniform distribution, the likelihood can be solved analytically.

With noise being added to both Bloom filter arrays according to the first threat model 212 represented in FIG. 2 in which 0s may be flipped to 1s but all 1s remain 1s (e.g., $f=0$, $q=1$, and p is variable), the probabilities defined in Equations 25 and 26 become $$q'=Pr(S_k=1|B_k=1)=1 \qquad \text{Eq. 42}$$

$$p'=Pr(S_k=1|B_k=0)=p \qquad \text{Eq. 43}$$

and the probabilities defined in Equations 28-30 become $$Pr(S_k=(0,0))=(1-p)^2(1-p_k)^{(n01+n10+n11)} \qquad \text{Eq. 44}$$

$$Pr(S_k=(1,0))=(1-p)(1-(1-p)(1-p_k)^{n10})(1-p_k)^{(n01+n11)} \qquad \text{Eq. 45}$$

$$Pr(S_k=(1,0))=(1-p)(1-(1-p)(1-p_k)^{n01})(1-p_k)^{(n10+n11)} \qquad \text{Eq. 46}$$

with $Pr(S_k=(1,1))$ equal to 1 minus the sum of Equations 44-45. As can be seen, when p=0, Equations 44-46 reduce to Equations 36-38 outlined above for the no noise example. Further, when p=1, each of Equations 44-46 evaluates to zero such that $Pr(S_k=(1,1))=1$, which makes sense because when p=1, the value of any element that was not allocated a user (e.g., remains a 0 after all allocations) will be bit-flipped to a 1 such that the array includes all 1s. As with the no noise example, the likelihood function for the overall cardinality of two Bloom filter arrays that include noise as outlined above (based on the first threat model 212) is the same as the general likelihood function defined in Equations 32 and 33. However, in this scenario where two Bloom filter arrays with partial noise are being analyzed, Equations 44-46 are substituted into Equation 32. Thus, the cardinality of two Bloom filter arrays with partial noise may be estimated by first numerically solving for the values of $n_{10}$, $n_{01}$, and $n_{11}$ that maximize the likelihood function of Equation 32 with Equations 44-46 substituted therein. Once the values of $n_{10}$, $n_{01}$, and $n_{11}$ have been solved for, the overall estimate of the cardinality for the unioned arrays corresponds to the sum of those values.

The above analysis may be generalized further for scenarios when each of the database proprietors 106a-b used different bit-flipping probabilities when adding noise. In such examples, the allocation probabilities are still the same as outlined above and expressed in the four expressions of Equation 24. The probabilities p' and q' are also the same as above except that a subscript is added to distinguish the probabilities, which are now array-specific:

$$q_j'=Pr(S_k^{(j)}=1|B_k^{(j)}=1) \text{ for each array } j \qquad \text{Eq. 47}$$

$$p_j'=Pr(S_k^{(j)}=1|B_k^{(j)}=0) \text{ for each array } j \qquad \text{Eq. 48}$$

Phrased slightly differently, and removing the index notation (k) within the Bloom filter arrays because noise acts independent of position, the bit-flipping probabilities may be expressed as follows:

$$Pr(1 \rightarrow 0) = 1 - q_1' \text{ for each array } j \qquad \text{Eq. 49}$$

$$Pr(0 \rightarrow 1) = p_j' \text{ for each array } j \qquad \text{Eq. 50}$$

The joint distribution between the two Bloom filter arrays is now what matters to estimate the overall cardinality across both datasets underlying the two arrays. $Pr(S_k=(0,0))$ as defined in Equation 27 is still valid, but may be simplified using the different probabilities to yield $$Pr(S_k = (0, 0)) = Pr(B_k = (0, 0))(1 - p_1*)(1 - p_2*) + \qquad \text{Eq. 51}$$
$$Pr(B_k = (0, 1))(1 - p_1*)(1 - q_2*) +$$
$$Pr(B_k = (1, 0))(1 - q_1*)(1 - p_2*) +$$
$$Pr(B_k = (1, 1))(1 - q_1*)(1 - q_2*)$$

Similar expressions to Equation 51 can be written for the other three combinations of joint values (e.g., (1,0), (0,1), and (1,1)). Substituting the expressions of Equation 24 into such equations and simplifying (e.g., using the definition of Equation 1) yield $$Pr(S_k=(0,0))=(1-p_k)^{(n10+n11)}(p_1-q_1)(-1+(1-p_k)^{n10}(p_2-q_2)+q_2)+$$

$$(-1+q_1)(-1+(1-p_k)^{(n10+n11)}(p_2-q_2)+q_2) \qquad \text{Eq. 52}$$

$$Pr(S_k=(1,0))=(1-p_k)^{(n01+n11)}(1-p_k)^{n10}(p_1-q_1)+q_1)(p_2-q_2)+$$

$$(-q_1+(1-p_k)^{(n10+n11)}(-p_1+q_1))(-1+q_2) \qquad \text{Eq. 53}$$

$$Pr(S_k=(0,1))=(1-p_k)^{(n10+n11)}(p_1-q_1)(1-p_k)^{n01}(p_2-q_2)+q_2)+$$

$$(-1+q_1)(-q_2+(1-p_k)^{(n01+n11)}(-p_2+q_2)) \qquad \text{Eq. 54}$$

$$Pr(S_k=(1,1))=(1-p_k)^{(n10+n11)}(1-p_k)^{n01}(p_1-q_1)+q_1)(p_2-q_2)+$$

$$((1-p_k)^{(n10+n11)}(p_1-q_1)+q_1)q_2 \qquad \text{Eq. 55}$$

where {p, q} is used instead of {p', q'} for notational simplicity. Notably, if there is no permanent randomized response (e.g., $f=0$), then the notation using the apostrophe (') is redundant because p'=p and q'=q. If there is permanent randomized response, then Equations 5 and 6 can be used to determine the respective values for p' and q'. Thus, the cardinality of two Bloom filter arrays with independently added noise may be estimated by first numerically solving for the values of $n_{10}$, $n_{01}$, and $n_{11}$ that maximize the likelihood function of Equation 32 with Equations 52-55 substituted therein. Once the values of $n_{10}$, $n_{01}$, and $n_{11}$ have been solved for, the overall estimate of the cardinality corresponds to the sum of those values.

An even more general scenario is possible if the differential privacy noise is not only different from one Bloom filter array to another, but that the noise probabilities differ from one element in the array to another. That is, the noise probabilities could be defined by index within a vector. The above equations remain valid except that an additional subscript needs to be added to the account for the particular index. That is, Equations 52-55 would be the same except for the following notational differences:

$$p_1 \rightarrow p_{1,k}$$

$$p_2 \rightarrow p_{2,k}$$

$$q_1 \rightarrow q_{1,k}$$

$$q_2 \rightarrow q_{2,k} \qquad \text{Eq. 56}$$

Thus, Equations 52-55 are a special case of the more general expressions based on Equation 56 in which $p_{1,k}=p_1$ for all k, for example.

In some examples, estimating the cardinality of two (or more) Bloom filter arrays may be simplified by analyzing a bitwise union array U of the separate arrays S provided by the database proprietors 106a-b. More particularly, in some examples, the bitwise union array is generated using the Boolean OR operation. That is, if the $k^{th}$ element of any one of the arrays S has a value of 1, the corresponding $k^{th}$ element of the bitwise union array U will be 1, whereas if the $k^{th}$ element of all arrays S is 0, the corresponding $k^{th}$ element of the bitwise union array U will be 0. In this situation, rather than there being four different probabilities for the union of two arrays (e.g., 00, 01, 10, and 11), the probabilities reduce to only two probabilities including either a 0 or a 1. More particularly, the probability of a 0 in the $k^{th}$ element of the bitwise union array corresponds to the probability of both arrays having a 0 in that element (e.g., $Pr(U_k=0)=Pr(S_k=(0, 0))$), where the notation $Pr(S_k=(X,Y))$ is shorthand for $Pr(S_k^{(1)}=X \text{ and } S_k^{(2)}=Y)$). Further, the probability of a 1 in the $k^{th}$ element of the bitwise union array corresponds to the probability of any one of the other possibilities outlined above (e.g., 01, 10, or 11). Alternatively, the probability of a 1 in the $k^{th}$ element of the bitwise union array may be expressed as 1 minus the probability of the element being a 0 because those are the only two possibilities.

As outlined above, when two arrays B are combined using a bitwise OR operation into a union array U, the probabilities of all possible outcomes (e.g., either a 0 or a 1) may be expressed in terms of the probability of both arrays B having a 0 at a given element in the arrays. In connection with this, it is noted that the probabilities of a particular element in two arrays both having a value of 0 for no noise (as expressed in Equation 39) and for partial noise (as expressed in Equation 44) include the exponent of $n_{10}+n_{01}+n_{11}$, which corresponds to the total cardinality N of the union of the two arrays. Thus, the individual partitions (e.g., $n_{10}$, $n_{01}$, and $n_{11}$) of the union may be replaced in Equations 39 and 44 with a single term N to yield the resulting probabilities for a union of two Bloom filter arrays with no noise (compare Equation 39) as $$Pr(U_k=0)=Pr(S_k=(0,0))=1-p_k^{(N)} \qquad \text{Eq. 57}$$

$$Pr(U_k=1)=1-Pr(U_k=0) \qquad \text{Eq. 58}$$

and the probabilities for the union of two Bloom filter arrays with partial noise (compare Equation 49) as $$Pr(U_k=0)=Pr(S_k=(0,0))=(1-p)^2(1-p_k)^{(N)} \qquad \text{Eq. 59}$$

$$Pr(U_k=1)=1-Pr(U_k=0) \qquad \text{Eq. 60}$$

Based upon the above simplifications arising from the bitwise union of the separate Bloom filter arrays, the likelihood function of Equation 32 may also be simplified and rewritten as $$\mathcal{L}(N|U) = \prod_{k=1}^{m} Pr(U_k = 0)^{[U_k=0]} Pr(U_k = 1)^{[U_k=1]} \qquad \text{Eq. 61}$$

with either Equations 57 and 58 or Equations 59 and 60 substituted therein depending on the nature of the noise added to the underlying Bloom filter arrays. In this example, the overall cardinality N may be estimated directly using any suitable numerical solver rather than first solving for the individual partitions (e.g., $n_{10}$, $n_{01}$, and $n_{11}$) that are then summed to arrive at the final estimation as needed when maximizing the likelihood function of Equation 32.

Although Equations 21-61 apply to the situation where two Bloom filter arrays are being combined, expressions may be derived for more than two Bloom filter arrays in a similar manner outlined above.

Figure 8:
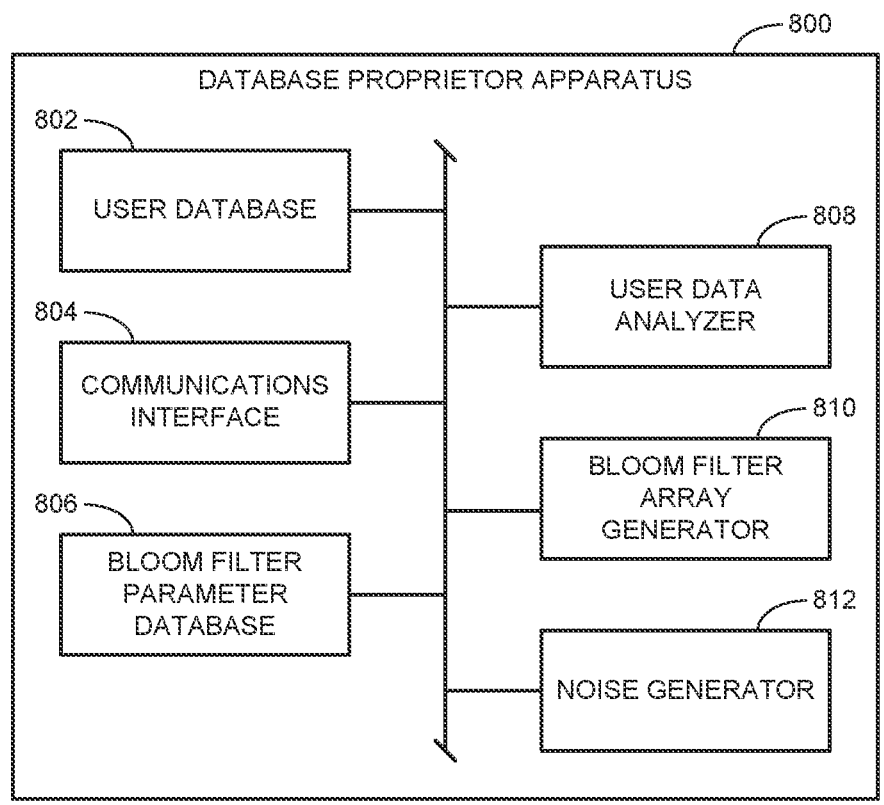
FIG. 8 is a block diagram of an example implementation of an example database proprietor apparatus of any one of the database proprietors of FIG. 1.

FIG. 8 is a block diagram of an example database proprietor apparatus 800. The example database proprietor apparatus 800 of FIG. 8 may correspond to any one of the database proprietors 106a-b of FIG. 1. As shown in the illustrated example, the database proprietor apparatus 800 includes an example user database 802, an example communications interface 804, an example Bloom filter parameter database 806, an example user data analyzer 808, an example Bloom filter array generator 810, and an example noise generator 812.

The example user database 802 stores user data associated with users (e.g., subscribers) registered with the database proprietor apparatus 800. In some examples, the user data includes a user identifier corresponding to any suitable PII. The example communications interface 804 enables the database proprietor apparatus 800 to communicate with the AME 102.

The example Bloom filter parameter database 806 stores the Bloom filter parameters used to define and/or generate one or more Bloom filter arrays representative of the users in the user database 802. In some examples, some or all of the Bloom filter parameters are determined and/or received from the AME 102 (e.g., via the communications interface 804). In some examples, some or all of the Bloom filter parameters are determined by one or more database proprietors 106a-b. In some examples, the Bloom filter parameters include one or more of a length (e.g., number of bits or elements) in the Bloom filter array, the identification of one or more hash function(s) used to map users to different elements of the Bloom filter array, the distribution of outputs of the hash function(s) across the different bits of the Bloom filter array and the corresponding mapping of hash function outputs to the different elements in the array (e.g., parameters defining the number of different hash function outputs that map to each element and the particular outputs that map to each particular element), and/or noise parameters (e.g., p' and q') to ensure differential privacy. Regardless of how the Bloom filter parameters are set or determined (e.g., whether by the AME 102 and/or the database proprietors 106a-b), the Bloom filter array length, hash function(s), and corresponding hash function output mapping are to be agreed upon by all database proprietors 106a-b. However, as mentioned above, each database proprietor 106a-b may use different noise parameters to add noise to its respective Bloom filter array. Furthermore, in some examples, the noise parameters used by a particular database proprietor 106a-b may be consistent across all elements in the corresponding Bloom filter array or the noise parameters may be defined with a vector having a different value corresponding to each element in the Bloom filter array.

The example user data analyzer 808 analyzes user data in the user database 802 to identify users that accessed media for which the AME 102 is interested in generating audience measurement metrics. The example Bloom filter array generator 810 generates Bloom filter arrays based on the Bloom filter parameters and the user information associated with users identified by the user data analyzer 808 to be included in the array. In some examples, the users to be included in the Bloom filter array are identified based on whether the users were exposed to media being tracked by the AME 102. An example process to generate a Bloom filter array in accordance with teachings disclosed herein is detailed below in connection with FIG. 10.

The example noise generator 812 adds noise to the Bloom filter arrays generated by the Bloom filter array generator 810 (e.g., as described above in connection with FIG. 2).

While an example manner of implementing the database proprietor apparatus 800 of FIG. 1 is illustrated in FIG. 8, one or more of the elements, processes and/or devices illustrated in FIG. 8 may be combined, divided, re-arranged, omitted, eliminated, and/or implemented in any other way. Further, the example user database 802, the example communications interface 804, the example Bloom filter parameter database 806, the example user data analyzer 808, the example Bloom filter array generator 810, the example noise generator 812 and/or, more generally, the example database proprietor apparatus 800 of FIG. 3 may be implemented by hardware, software, firmware and/or any combination of hardware, software and/or firmware. Thus, for example, any of the example user database 802, the example communications interface 804, the example Bloom filter parameter database 806, the example user data analyzer 808, the example Bloom filter array generator 810, the example noise generator 812 and/or, more generally, the example database proprietor apparatus 800 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example user database 802, the example communications interface 804, the example Bloom filter parameter database 806, the example user data analyzer 808, the example Bloom filter array generator 810, and/or the example noise generator 812 is/are hereby expressly defined to include a non-transitory computer readable storage device or storage disk such as a memory, a digital versatile disk (DVD), a compact disk (CD), a Blu-ray disk, etc. including the software and/or firmware. Further still, the example database proprietor apparatus 800 of FIG. 8 may include one or more elements, processes and/or devices in addition to, or instead of, those illustrated in FIG. 8, and/or may include more than one of any or all of the illustrated elements, processes and devices.

FIG. 9 is a block diagram of an example implementation of the example audience metrics generator 112 of the AME 102 of FIG. 1. The example audience metrics generator 112 includes an example audience population analyzer 902, an example communications interface 904, an example Bloom filter parameter analyzer 906, an example Bloom filter parameter database 908, an example cardinality analyzer 910, and an example report generator 912.

The example audience population analyzer 902 determines a universe estimate for the size of population that may potentially be reached by a particular media based on the geographic region where the media is distributed, the platforms through which the media is distributed, and/or any other suitable factor(s). The example communications interface 904 enables the audience metrics generator 112 to communicate with the database proprietors 106a-b.

The example Bloom filter parameter analyzer 906 determines suitable parameters for Bloom filter arrays based on the universe estimate of the audience population analyzer 902. More particularly, in some examples, the Bloom filter parameter analyzer 906 determines parameters defining the distribution for the different bits of Bloom filter arrays with a lower probability threshold determined based on a maximum expected number of users in an underlying dataset to be represented in the Bloom filter array. In some examples, the expected number of users is determined based on the universe estimate. Further, in some examples, the Bloom filter parameter analyzer 906 determines a suitable length for the Bloom filter array based on the universe estimate and/or a desired saturation level for the filter. Additionally, in some examples, the Bloom filter parameter analyzer 906 determines parameters defining the hash function(s) used to evaluate PII data associated with particular users to be represented in the Bloom filter array and how outputs of the hash functions map to particular bits or elements of the array based on the particular distribution involved. In some examples, the parameters defining the hash function(s) and associated distribution and length of the Bloom filter array are stored in the Bloom filter parameter database 908 along with other Bloom filter parameters (e.g., noise parameters). Further, in some examples, the Bloom filter parameters stored in the database 908 may be provided to the database proprietors 106a-b via the example communications interface 904. In some examples, the noise parameters (and/or other Bloom filter parameters) may be provided by the database proprietors 106a-b and received via the communications interface 904.

The example cardinality analyzer 910 analyzes Bloom filter arrays received from the database proprietors 106a-b to estimate the cardinality or total number of unique users represented in individual ones of the Bloom filter arrays and/or across the union of multiple such Bloom filter arrays. More particularly, in the scenario where there is only one Bloom filter array to be analyzed from one database proprietor 106a-b, the example cardinality analyzer 910 numerically solves for the value of n that maximizes the likelihood defined in Equation 9. As outlined above, the analysis may be simplified in the scenario where there is no noise to the likelihood expressed in Equation 14. Where there is partial noise (e.g., only 0s flipped to is while all 1s remain as 1s), the likelihood may be analyzed in accordance with Equation 20. In examples where there are two Bloom filter arrays from two different database proprietors 106a-b, the cardinality analyzer 910 numerically solves for the cardinality N (e.g., the total of the three variables $n_{10}$, $n_{01}$, and $n_{11}$) that maximizes the likelihood defined in Equation 32 based on the probability definitions defined in Equations 28-31, Equations 39-41, Equations 44-46, or Equations 52-55 depending on the noise parameters used when generating the Bloom filter arrays. In some examples, the cardinality N is estimated by first solving for the value of the three partitions (e.g., $n_{10}$, $n_{01}$, and $n_{11}$) that results in the global maximum of the likelihood function of Equation 32. However, in some examples, the analysis may be simplified by solving directly for the total cardinality N based on the bitwise OR union of the two Bloom filter arrays when the arrays include either no noise or only partial noise. In such examples, the cardinality is estimated by solving for the global maximum of the likelihood function expressed in Equation 61. The example cardinality analyzer 910 performs a similar numerical analysis for likelihood expressions defined for three or more database proprietors that are derived in a similar manner to the examples of one or two database proprietors outlined in detail above.

In some examples, cardinality estimates are generated on a relatively frequent basis (e.g., once a day). Accordingly, where the Bloom filter arrays may be thousands of bits long and be representative of 100s of thousands or even millions of users, it is necessary to implement the numerical analysis on a computer because such analysis cannot practically be performed by a human in their mind and/or using pen and paper in so short a time.

The example report generator 912 generates any suitable report conveying audience measurement information and estimates. In some examples, where the Bloom filter arrays correspond to exposure to an advertisement in an advertising campaign, the report generated by the report generator 912 includes an indication of reach of the advertising campaign. That is, the report includes an indication of the total number of unique individuals that were exposed to the advertisement during a relevant period of time. In some examples, the total number of unique individuals corresponds to the cardinality estimate for a unioned set of Bloom filter arrays as described above.

While an example manner of implementing the audience metrics generator 112 of FIG. 1 is illustrated in FIG. 9, one or more of the elements, processes and/or devices illustrated in FIG. 9 may be combined, divided, re-arranged, omitted, eliminated, and/or implemented in any other way. Further, the example audience population analyzer 902, the example communications interface 904, the example Bloom filter parameter analyzer 906, the example Bloom filter parameter database 908, the example cardinality analyzer 910, the example report generator 912 and/or, more generally, the example audience metrics generator 112 of FIG. 1 may be implemented by hardware, software, firmware and/or any combination of hardware, software and/or firmware. Thus, for example, any of the example audience population analyzer 902, the example communications interface 904, the example Bloom filter parameter analyzer 906, the example Bloom filter parameter database 908, the example cardinality analyzer 910, the example report generator 912 and/or, more generally, the example audience metrics generator 112 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example audience population analyzer 902, the example communications interface 904, the example Bloom filter parameter analyzer 906, the example Bloom filter parameter database 908, the example cardinality analyzer 910, and/or the example report generator 912 is/are hereby expressly defined to include a non-transitory computer readable storage device or storage disk such as a memory, a digital versatile disk (DVD), a compact disk (CD), a Blu-ray disk, etc. including the software and/or firmware. Further still, the example audience metrics generator 112 of FIG. 1 may include one or more elements, processes and/or devices in addition to, or instead of, those illustrated in FIG. 9, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 10:
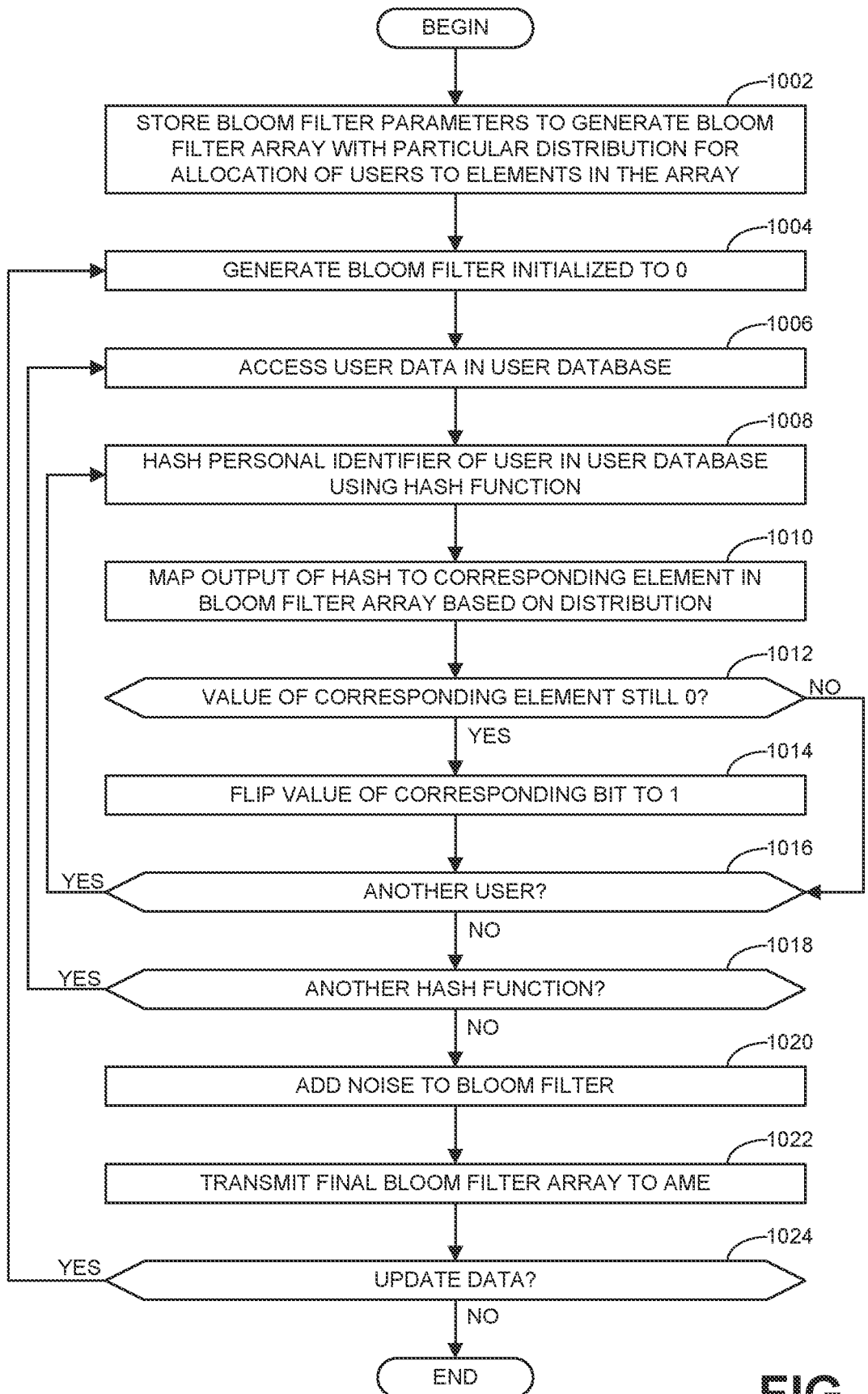
FIG. 10 is a flowchart representative of example machine readable instructions that may be executed to implement the example database proprietor apparatus of FIGS. 1 and/or 8.

A flowchart representative of example hardware logic, machine readable instructions, hardware implemented state machines, and/or any combination thereof for implementing the database proprietor apparatus 800 of FIGS. 1 and/or 8 is shown in FIG. 10. The machine readable instructions may be one or more executable programs or portion(s) of an executable program for execution by a computer processor and/or processor circuitry, such as the processor 1312 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowchart illustrated in FIG. 10, many other methods of implementing the example database proprietor apparatus 800 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

Figure 11:
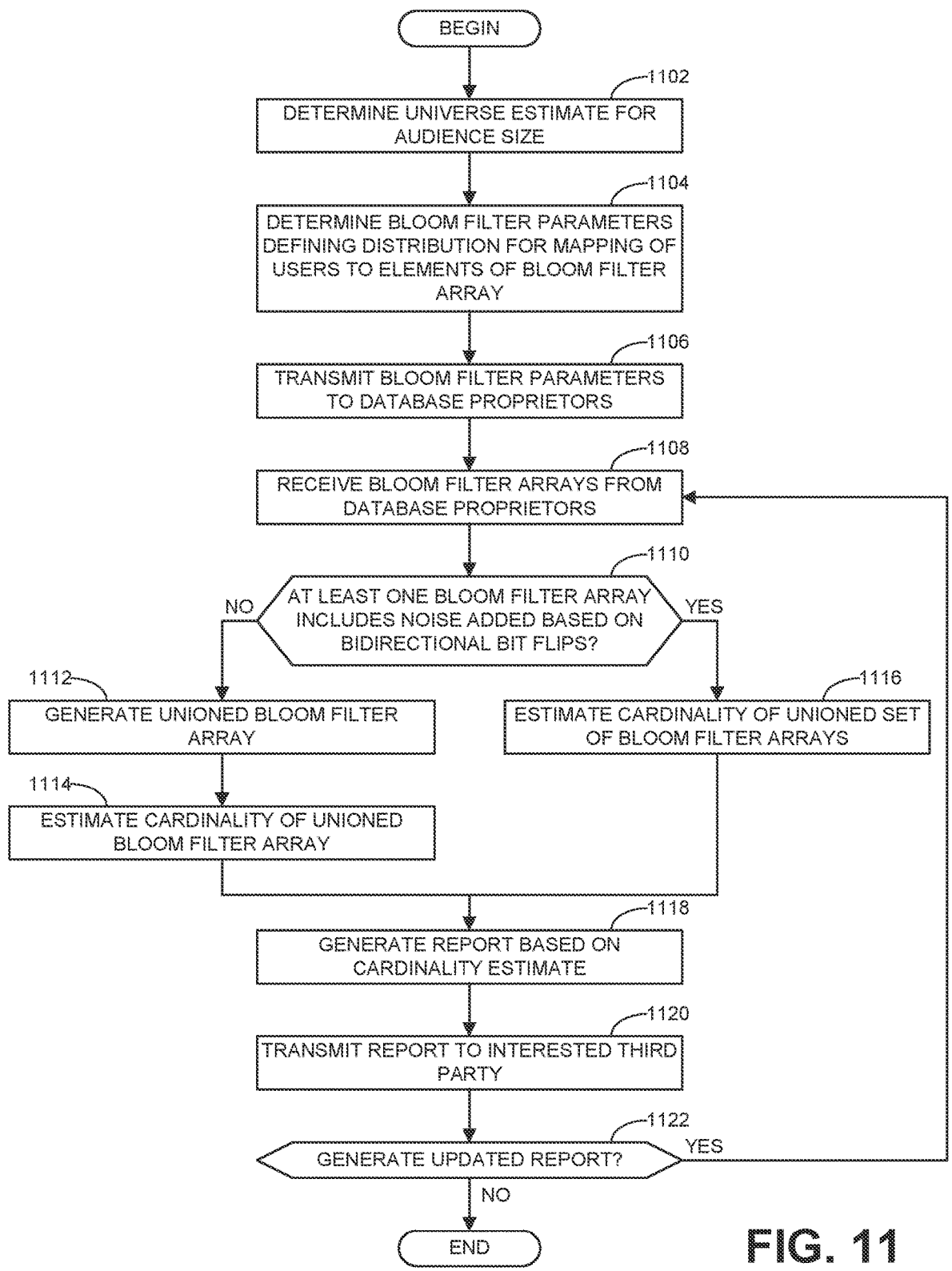
FIG. 11 is a flowchart representative of example machine readable instructions that may be executed to implement the example audience measurement entity apparatus of FIG. 9.
Figure 12:
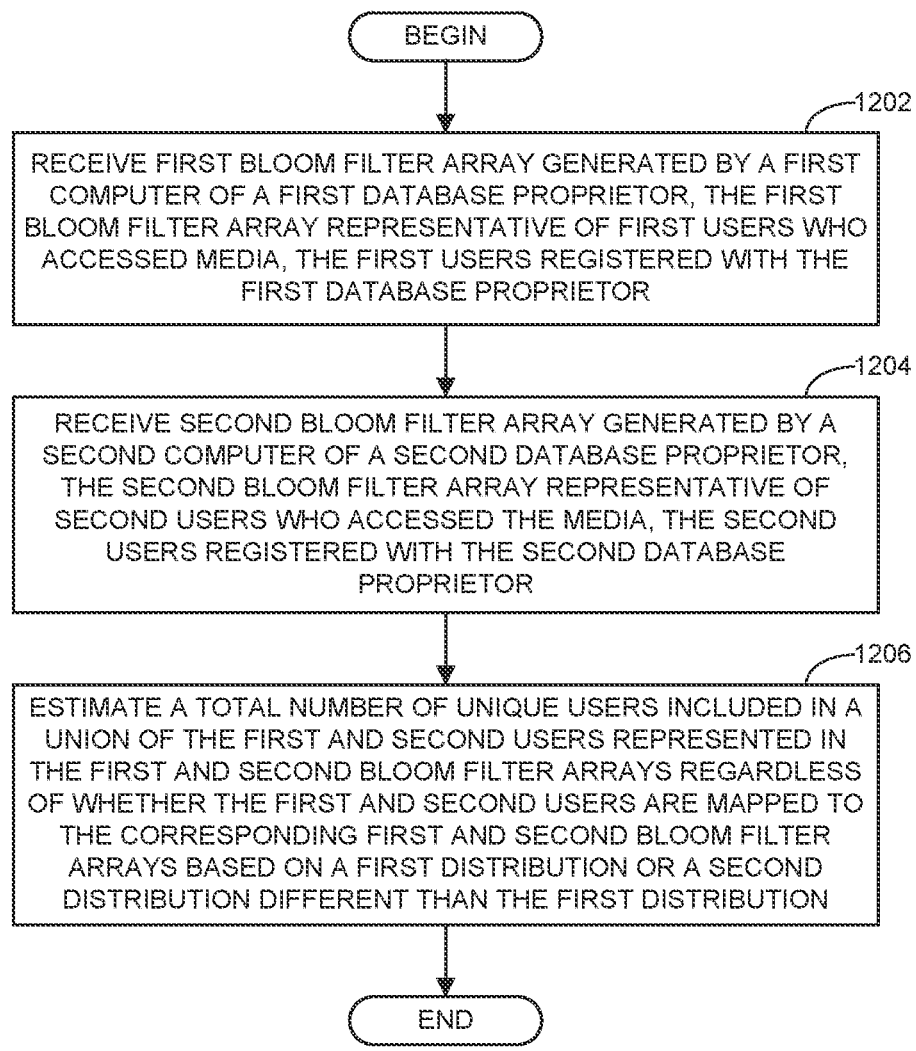
FIG. 12 is a flowchart representative of example machine readable instructions that may be executed to implement the example database proprietor apparatus of FIGS. 1 and/or 8.

Flowcharts representative of example hardware logic, machine readable instructions, hardware implemented state machines, and/or any combination thereof for implementing the audience metrics generator 112 of FIGS. 1 and/or 9 are shown in FIGS. 11 and 12. The machine readable instructions may be one or more executable programs or portion(s) of an executable program for execution by a computer processor and/or processor circuitry, such as the processor 1412 shown in the example processor platform 1400 discussed below in connection with FIG. 14. The program may be embodied in software stored on a non-transitory computer readable storage medium such as a CD-ROM, a floppy disk, a hard drive, a DVD, a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowchart illustrated in FIGS. 11 and 12, many other methods of implementing the example audience metrics generator 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 10-12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

In some examples, the program of FIG. 10 is independently implemented by each database proprietor 106a-b (FIG. 1) that is to provide a Bloom filter array to the AME 102 (FIG. 1) in connection with a particular item of media for which exposure metrics are desired. The program of FIG. 10 begins at block 1002 where the example Bloom filter parameter database 806 (FIG. 8) stores Bloom filter parameter to generate a Bloom filter array with a particular distribution for the allocation of users to elements in the array. In some examples, the distribution is a non-uniform distribution. At block 1004, the example Bloom filter array generator 810 (FIG. 8) generates a Bloom filter array initialized to 0. In some examples, the length of the Bloom filter array is defined by and/or agreed upon between the AME 102 and each database proprietor 106a-b that is to generate a Bloom filter array based on the example process of FIG. 10. At block 1006, the example user data analyzer 808 (FIG. 8) accesses user data in the user database 802. At block 1008, the example Bloom filter array generator 810 (FIG. 8) hashes a personal identifier in the user database 802 using a hash function defined in the Bloom filter parameters. At block 1010, the example Bloom filter array generator 810 maps an output of the hash to a corresponding element in the Bloom filter array based on the distribution (e.g., the distribution associated with the Bloom filter parameters stored at block 1002). At block 1012, the example Bloom filter generator 810 determines whether the value of the corresponding element is still 0. If so, control advances to block 1014 where the example Bloom filter generator 810 flips the value of the corresponding bit to 1. Thereafter, control advances to block 1016. Returning to block 1012, if the value of the corresponding bit has already been flipped to 1, control advances directly to block 1016.

At block 1016, the example Bloom filter array generator 810 determines whether there is another user. If so, control returns to block 1008. If not, control advances to block 1018 where the example Bloom filter array generator 810 determines whether there is another hash function. If so, control returns to block 1006. Otherwise, control advances to block 1020 where the example noise generator 812 adds noise to the Bloom filter array. In some examples, the example noise generator 812 (FIG. 8) adds noise by randomly flipping bits having a value of 0 to 1 with a probability of p. In some instances, the example noise generator 812 may randomly flip bits having a value of 0 to 1 with a probability of p and also flip bits having a value of 1 to 0 with a probability of 1-q. At block 1022, the example communications interface 804 transmits the final Bloom filter array to the AME 102. In some examples, the noise parameters used to add the noise may also be transmitted to the AME 102. However, in other examples, the noise parameters may be determined in advance and included within the Bloom filter parameters previously made available to the AME 102. At block 1024, the example Bloom filter array generator 810 determines whether to update the data. In some examples, data is updated on a relatively frequent basis (e.g., once a week, once a day, etc.). If the data is to be updated, control returns to block 1004 to repeat the process. Otherwise, the example instructions of FIG. 10 ends.

The program of FIG. 11 begins at block 1102 where the example audience population analyzer 902 (FIG. 9) determines a universe estimate for an audience size. At block 1104, the example Bloom filter parameter analyzer 906 (FIG. 9) determines Bloom filter parameters defining the distribution for the mapping of users to elements of a Bloom filter array. At block 1106, the example communications interface 904 (FIG. 9) transmits the Bloom filter parameters to the database proprietors 106a-b. At block 1108, the example cardinality analyzer 910 (FIG. 9) obtains Bloom filter arrays (e.g., the sketch data 132a-b of FIG. 1) from the database proprietors 106a-b (FIG. 1). In some examples, the Bloom filters are received via the communications interface 904 in connection with the transmission of block 1022 of FIG. 10. In some examples, along with the Bloom filter arrays, the database proprietors 106a-b may provide noise parameters defining the probabilities at which noise was added to the respective Bloom filter arrays.

At block 1110, the example cardinality analyzer 910 determines whether at least one of the bloom filter arrays includes noise added based on bidirectional bit flips. As used herein, a bidirectional bit flips refers to noise that is added by flipping both 0s to 1s and 1s to 0s. By contrast, a one-directional bit-flip refers to noise that is added by flipping 0s to 1s without flipping any 1s to 0s. If none of the Bloom filter arrays include noise added based on bidirectional bit flips, the analysis can be simplified by combining the separate Bloom filter arrays into a single unioned array. Accordingly, in such examples, control advances to block 1112 where the example cardinality analyzer 910 generates a unioned Bloom filter array. In some examples, the unioned Bloom filter array is generated by combining the separate Bloom filter arrays via a bitwise OR operation. That is, the unioned Bloom filter array will have a 1 assigned to a particular bit position if at least one of the Bloom filter arrays from the database proprietors 106a-b had a 1 at the corresponding bit position. However, if all of the Bloom filter arrays from the database proprietors 106a-b had a 0 at a particular bit position, the bit value in the corresponding bit of the unioned array will be 0. At block 1114, the example cardinality analyzer 910 estimates the cardinality of the unioned Bloom filter array before control advances to block 1118. In some examples, the estimation is accomplished by numerically solving for the cardinality N that maximizes the likelihood function as expressed in Equation 61.

Returning to block 1110, if at least one Bloom filter array includes noise added based on bidirectional bit flips, control advances to block 1116 where the example cardinality analyzer 910 estimates the cardinality of the unioned set of Bloom filter arrays. That is, while the cardinality estimation corresponds to the union of data represented by the Bloom filter arrays, the individual Bloom filter arrays are not actually unioned in a bitwise manner as described above in connection with block 1112. Rather, the cardinality estimate is accomplished by first numerically solving for the individual partitions (e.g., $n_{10}$, $n_{01}$, and $n_{11}$) of the unioned set of Bloom filter arrays that maximizes the likelihood function as expressed in Equation 32. More particularly, Equation 32 may be analyzed using the probability definitions defined in Equations 28-31, Equations 39-41, Equations 44-46, or Equations 52-55 depending on the noise parameters used when generating the Bloom filter arrays. Once the values for the separate data partitions are determined, the values are summed to arrive at the overall cardinality estimation. Thereafter, control advances to block 1118.

At block 1118, the example report generator 912 (FIG. 9) generates a report based on the cardinality estimate. At block 1120, the example communications interface 904 transmits the report to an interested third party. At block 1122, the example report generator 912 determines whether to generate an updated and/or new report. As mentioned above, in some examples, reports are generated on a relatively frequent basis (e.g., weekly, daily, etc.). If an updated and/or new report is to be generated, control returns to block 1108. Otherwise, the example process of FIG. 11 ends.

The example program of FIG. 12 begins at block 1202 where the example communications interface 904 (FIG. 9) accesses and/or receives a first Bloom filter array generated by a first computer of a first database proprietor, where the first Bloom filter array is representative of first users who accessed media, the first users being registered with the first database proprietor. At block 1204, the example communications interface 904 accesses and/or receives a second Bloom filter array generated by a second computer of a second database proprietor, where the second Bloom filter array is representative of second users who accessed the media, the second users being registered with the second database proprietor. At block 1206, the example cardinality analyzer 910 estimates a total number of unique users included in a union of the first and second users represented in the first and second Bloom filter arrays regardless of whether the first and second users are mapped to the corresponding first and second Bloom filter arrays based on a first distribution or a second distribution different than the first distribution. Thereafter, the example process of FIG. 12 ends.

Figure 13:
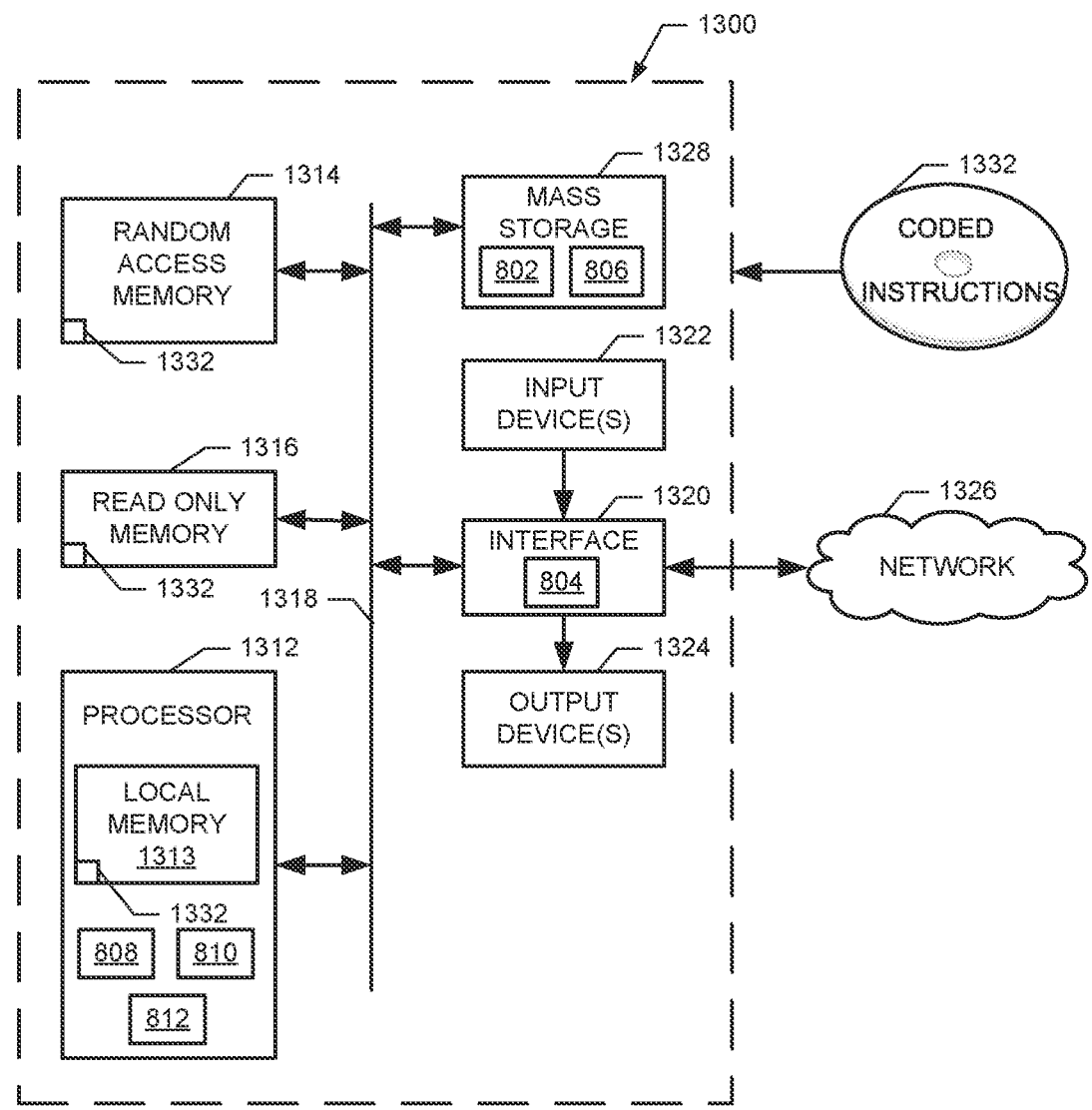
FIG. 13 is a block diagram of an example processing platform structured to execute the example instructions of FIG. 10 to implement the example database proprietor apparatus of FIGS. 1 and/or 8.

FIG. 13 is a block diagram of an example processor platform 1300 structured to execute the instructions of FIG. 10 to implement the example database proprietor apparatus 800 of FIGS. 1 and/or 8. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example user data analyzer 808, the example Bloom filter array generator 810, and the example noise generator 812.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface. In this example, the interface circuit 1320 implements the example communications interface 804.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives.

The machine executable instructions 1332 of FIG. 10 may be stored in the mass storage device 1328, in the volatile memory 1314, in the non-volatile memory 1316, and/or on a removable non-transitory computer readable storage medium such as a CD or DVD. In this example, the mass storage devices 1328 implement the example user database 802 and the example Bloom filter parameter database 806.

Figure 14:
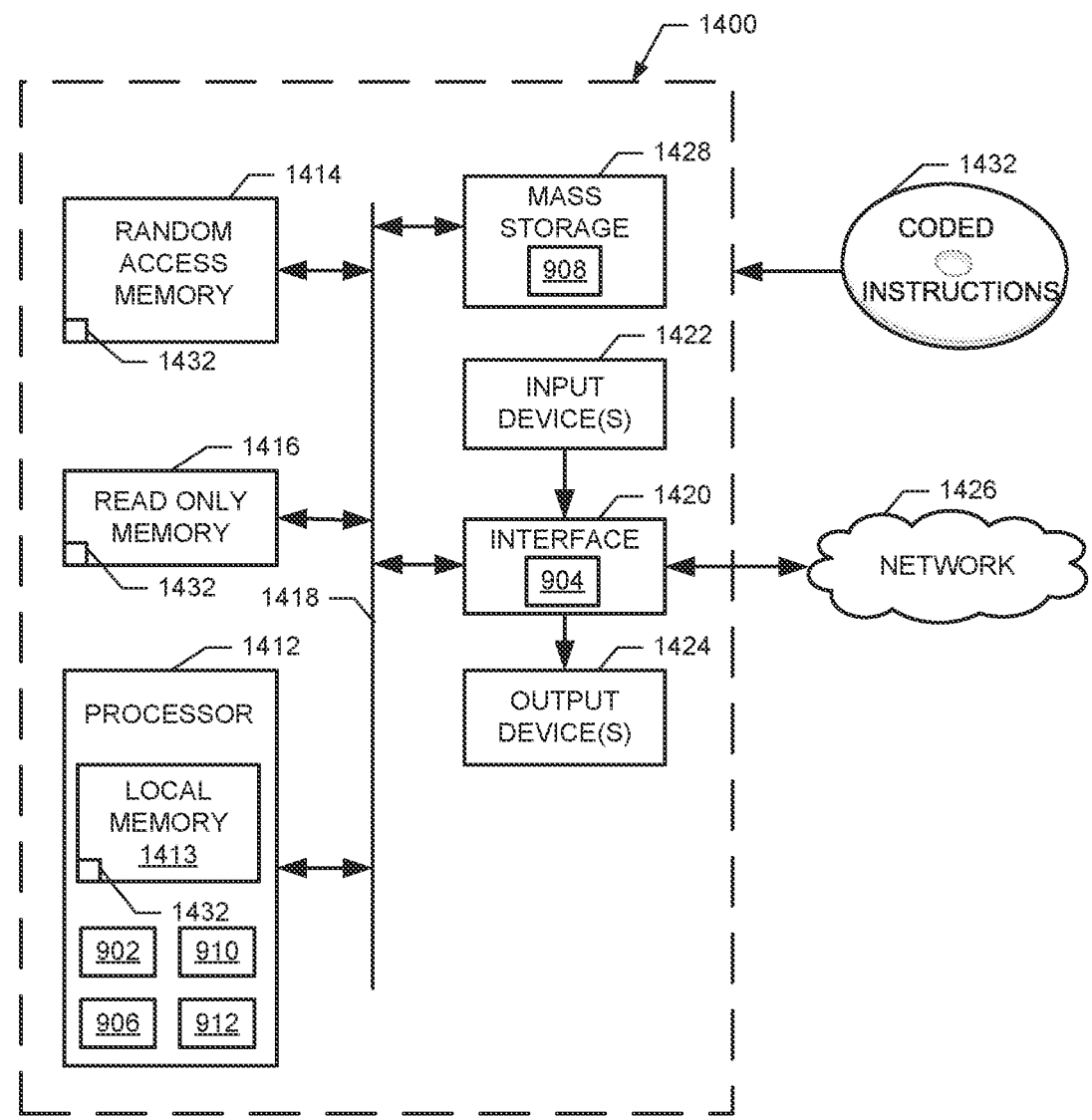
FIG. 14 is a block diagram of an example processing platform structured to execute the example instructions of FIGS. 11 and/or 12 to implement the example audience metrics generator of FIGS. 1 and/or 9.

FIG. 14 is a block diagram of an example processor platform 1400 structured to execute the instructions of FIGS. 11 and/or 12 to implement the audience metrics generator 112 of FIGS. 1 and/or 9. The processor platform 1400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example audience population analyzer 902, the example Bloom filter parameter analyzer 906, the example cardinality analyzer 910, and the example report generator 912.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), a Bluetooth® interface, a near field communication (NFC) interface, and/or a PCI express interface. In this example, the interface circuit 1420 implements the example communications interface 904.

In the illustrated example, one or more input devices 1422 are connected to the interface circuit 1420. The input device(s) 1422 permit(s) a user to enter data and/or commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1420 of the illustrated example, thus, typically includes a graphics driver card, a graphics driver chip and/or a graphics driver processor.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, redundant array of independent disks (RAID) systems, and digital versatile disk (DVD) drives. In this example, the mass storage devices 1428 implements the example Bloom filter parameter database 908.

The machine executable instructions 1432 of FIGS. 11 and/or 12 may be stored in the mass storage device 1428, in the volatile memory 1414, in the non-volatile memory 1416, and/or on a removable non-transitory computer readable storage medium such as a CD or DVD.

From the foregoing, it will be appreciated that example methods, apparatus and articles of manufacture have been disclosed that enable a more accurate estimation of cardinality of a single Bloom filter array or the combination of multiple Bloom filter arrays than is possible using previously known methodologies. The Bloom filter arrays are a type of sketch data that arises in the context of privacy concerns in an online world generated from walled garden (closed platform) data. Thus, examples disclosed herein provide the practical benefit of enabling database proprietors to share summary statistics (e.g., Bloom filter arrays) that are differentially private while still being able to reliably estimate the cardinality of such Bloom filter arrays. Further, through the use of non-uniform distributions, Bloom filter arrays may be generated with data that can reliably represent a relatively large range of population sizes for different database proprietors. Thus, examples disclosed herein provide the additional practical benefit of being able to combine or union Bloom filter arrays generated by diverse database proprietors having significantly different sizes of databases and still enable accurate estimates of cardinality for the union of such Bloom filter arrays.

Example 1 includes an apparatus comprising a communications interface to receive a first Bloom filter array generated by a first computer of a first database proprietor, the first Bloom filter array representative of first users who accessed media, the first users registered with the first database proprietor, and receive a second Bloom filter array generated by a second computer of a second database proprietor, the second Bloom filter array representative of second users who accessed the media, the second users registered with the second database proprietor, and a cardinality analyzer to estimate a total number of unique users included in a union of the first users represented in the first Bloom filter array and the second users represented in the second Bloom filter array regardless of whether the first and second users are mapped, based on a first distribution or a second distribution different than the first distribution, to the corresponding first and second Bloom filter arrays.

Example 2 includes the apparatus of example 1, wherein the cardinality analyzer is to estimate the total number of unique users by numerically solving for a number of users that maximizes a likelihood of producing the union of the first and second users represented in the first and second Bloom filter arrays.

Example 3 includes the apparatus of example 1, wherein at least one of the first distribution or the second distribution is a non-uniform distribution.

Example 4 includes the apparatus of example 3, wherein the non-uniform distribution is a geometric distribution.

Example 5 includes the apparatus of example 3, wherein a lowest probability defined by the non-uniform distribution for any bit in the first Bloom filter array is greater than or equal to a threshold defined based on a universe estimate of a population containing both the first and second users.

Example 6 includes the apparatus of example 3, wherein an array length of the first and second Bloom filter arrays is shorter when the first and second Bloom filter arrays are generated based on the at least one of the first distribution or the second distribution than when the first and second Bloom filter arrays are generated based on a uniform distribution.

Example 7 includes the apparatus of example 1, wherein the cardinality analyzer is to estimate the total number of unique users included in a union of users represented in more than two Bloom filter arrays, the more than two Bloom filter arrays including the first and second Bloom filter arrays.

Example 8 includes the apparatus of example 1, wherein the estimation of the total number of unique users is based on values of both leading bits and trailing bits in the first and second Bloom filter arrays.

Example 9 includes the apparatus of example 1, wherein the estimation of the total number of unique users is based on values of all bits in both the first and second Bloom filter arrays.

Example 10 includes the apparatus of example 1, wherein the estimation of the total number of unique users has an error, at a 95% confidence interval, of less than 5% for different amounts of noise added to at least one of the first or second Bloom filter arrays, the different amounts of noise ranging from 0% noise up to at least 10% noise.

Example 11 includes the apparatus of example 1, wherein the estimation of the total number of unique users has an error, at a 95% confidence interval, of less than 5% for different values of a ratio of the total number of unique users to a length of the first Bloom filter array, the different values ranging from example 0 includes 125 to example 8 includes example 12 includes a non-transitory computer readable medium comprising instructions that, when executed, causes a processor to at least access a first Bloom filter array generated by a first computer of a first database proprietor, the first Bloom filter array representative of first users who accessed media, the first users registered with the first database proprietor, access a second Bloom filter array generated by a second computer of a second database proprietor, the second Bloom filter array representative of second users who accessed the media, the second users registered with the second database proprietor, and estimate a total number of unique users included in a union of the first and second users represented in corresponding ones of the first and second Bloom filter arrays regardless of whether the first and second users are mapped, based on a first distribution or a second distribution different than the first distribution, to the corresponding first and second Bloom filter arrays.

Example 13 includes the non-transitory computer readable medium of example 12, wherein the instructions further cause the processor to estimate the total number of unique users by numerically solving for a number of users that maximizes a likelihood of producing the union of the first and second users as represented in the first and second Bloom filter arrays.

Example 14 includes the non-transitory computer readable medium of example 12, wherein at least one of the first distribution or the second distribution is a non-uniform distribution.

Example 15 includes the non-transitory computer readable medium of example 14, wherein the non-uniform distribution is a geometric distribution.

Example 16 includes the non-transitory computer readable medium of example 14, wherein a lowest probability defined by the non-uniform distribution for any bit in the first Bloom filter array is greater than or equal to a threshold defined based on a universe estimate of a population containing both the first and second users.

Example 17 includes the non-transitory computer readable medium of example 14, wherein an array length of the first and second Bloom filter arrays is shorter when the first and second Bloom filter arrays are generated based on the at least one of the first distribution or the second distribution than when the first and second Bloom filter arrays are generated based on a uniform distribution.

Example 18 includes the non-transitory computer readable medium of example 12, wherein the instructions further cause the processor to estimate the total number of unique users included in a union of users represented in more than two Bloom filter arrays, the more than two Bloom filter arrays including the first and second Bloom filter arrays.

Example 19 includes the non-transitory computer readable medium of example 12, wherein the estimation of the total number of unique users is based on values of both leading bits and trailing bits in the first and second Bloom filter arrays.

Example 20 includes the non-transitory computer readable medium of example 12, wherein the estimation of the total number of unique users is based on values of all bits in both the first and second Bloom filter arrays.

Example 21 includes the non-transitory computer readable medium of example 12, wherein the estimation of the total number of unique users has an error, at a 95% confidence interval, of less than 5% for different amounts of noise added to at least one of the first or second Bloom filter arrays, the different amounts of noise ranging from 0% noise up to at least 10% noise.

Example 22 includes the non-transitory computer readable medium of example 12, wherein the estimation of the total number of unique users has an error, at a 95% confidence interval, of less than 5% for different values of a ratio of the total number of unique users to a length of the first Bloom filter array, the different values ranging from example 0 includes 125 to example 8 includes example 23 includes a method comprising accessing a first Bloom filter array generated by a first computer of a first database proprietor, the first Bloom filter array representative of first users who accessed media, the first users registered with the first database proprietor, accessing a second Bloom filter array generated by a second computer of a second database proprietor, the second Bloom filter array representative of second users who accessed the media, the second users registered with the second database proprietor, and estimating, by executing an instruction with a processor, a total number of unique users included in a union of the first and second users represented in corresponding ones of the first and second Bloom filter arrays regardless of whether the first and second users are mapped, based on a first distribution or a second distribution different than the first distribution, to the corresponding first and second Bloom filter arrays.

Example 24 includes the method of example 23, further including estimating the total number of unique users by numerically solving for a number of users that maximizes a likelihood of producing the union of the first and second users as represented in the first and second Bloom filter arrays.

Example 25 includes the method of example 23, wherein at least one of the first distribution or the second distribution is a non-uniform distribution.

Example 26 includes the method of example 25, wherein the non-uniform distribution is a geometric distribution.

Example 27 includes the method of example 25, wherein a lowest probability defined by the non-uniform distribution for any bit in the first Bloom filter array is greater than or equal to a threshold defined based on a universe estimate of a population containing both the first and second users.

Example 28 includes the method of example 25, wherein an array length of the first and second Bloom filter arrays is shorter when the first and second Bloom filter arrays are generated based on the at least one of the first distribution or the second distribution than when the first and second Bloom filter arrays are generated based on a uniform distribution.

Example 29 includes the method of example 23, further including estimating the total number of unique users included in a union of users represented in more than two Bloom filter arrays, the more than two Bloom filter arrays including the first and second Bloom filter arrays.

Example 30 includes the method of example 23, wherein the estimation of the total number of unique users is based on values of both leading bits and trailing bits in the first and second Bloom filter arrays.

Example 31 includes the method of example 23, wherein the estimation of the total number of unique users is based on values of all bits in both the first and second Bloom filter arrays.

Example 32 includes the method of example 23, wherein the estimation of the total number of unique users has an error, at a 95% confidence interval, of less than 5% for different amounts of noise added to at least one of the first or second Bloom filter arrays, the different amounts of noise ranging from 0% noise up to at least 10% noise.

Example 33 includes the method of example 23, wherein the estimation of the total number of unique users has an error, at a 95% confidence interval, of less than 5% for different values of a ratio of the total number of unique users to a length of the first Bloom filter array, the different values ranging from example 0 includes 125 to example 8 includes example 34 includes an apparatus comprising means for communicating, the means for communicating to receive a first Bloom filter array generated by a first computer of a first database proprietor, the first Bloom filter array representative of first users who accessed media, the first users registered with the first database proprietor, receive a second Bloom filter array generated by a second computer of a second database proprietor, the second Bloom filter array representative of second users who accessed the media, the second users registered with the second database proprietor, and means for analyzing, the means for analyzing to estimate a total number of unique users included in a union of the first and second users represented in corresponding ones of the first and second Bloom filter arrays regardless of whether the first and second users are mapped, based on a first distribution or a second distribution different than the first distribution, to the corresponding first and second Bloom filter arrays.

Example 35 includes the apparatus of example 34, wherein the means for analyzing is to estimate the total number of unique users by numerically solving for a number of users that maximizes a likelihood of producing the union of the first and second users as represented in the first and second Bloom filter arrays.

Example 36 includes the apparatus of example 34, wherein at least one of the first distribution or the second distribution is a non-uniform distribution.

Example 37 includes the apparatus of example 36, wherein the non-uniform distribution is a geometric distribution.

Example 38 includes the apparatus of example 36, wherein a lowest probability defined by the non-uniform distribution for any bit in the first Bloom filter array is greater than or equal to a threshold defined based on a universe estimate of a population containing both the first and second users.

Example 39 includes the apparatus of example 36, wherein an array length of the first and second Bloom filter arrays is shorter when the first and second Bloom filter arrays are generated based on the at least one of the first distribution or the second distribution than when the first and second Bloom filter arrays are generated based on a uniform distribution.

Example 40 includes the apparatus of example 34, wherein the means for analyzing is to estimate the total number of unique users included in a union of users represented in more than two Bloom filter arrays, the more than two Bloom filter arrays including the first and second Bloom filter arrays.

Example 41 includes the apparatus of example 34, wherein the estimation of the total number of unique users is based on values of both leading bits and trailing bits in the first and second Bloom filter arrays.

Example 42 includes the apparatus of example 34, wherein the estimation of the total number of unique users is based on values of all bits in both the first and second Bloom filter arrays.

Example 43 includes the apparatus of example 34, wherein the estimation of the total number of unique users has an error, at a 95% confidence interval, of less than 5% for different amounts of noise added to at least one of the first or second Bloom filter arrays, the different amounts of noise ranging from 0% noise up to at least 10% noise.

Example 44 includes the apparatus of example 34, wherein the estimation of the total number of unique users has an error, at a 95% confidence interval, of less than 5% for different values of a ratio of the total number of unique users to a length of the first Bloom filter array, the different values ranging from example 0 includes 125 to example 8 includes.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system comprising:
a communication interface to:
access a first Bloom filter array generated by a first computer of a first database proprietor, the first Bloom filter array representative of first entries in a first database of the first database proprietor, the first entries allocated to ones of first elements in the first Bloom filter array based on a non-uniform distribution of outputs of a hash function applied to the first entries, and
access a second Bloom filter array generated by a second computer of a second database proprietor, the second Bloom filter array representative of second entries in a second database of the second database proprietor, the second entries allocated to ones of second elements in the second Bloom filter array based on the non-uniform distribution of the outputs of the hash function applied to the second entries;
one or more processors; and
machine readable instructions to cause the one or more processors to estimate a cardinality of a union of the first and second entries based on the non-uniform distribution of the outputs of the hash function,
wherein the non-uniform distribution is a geometric distribution in which a leftmost bit of a Bloom filter array has a highest probability of mapping a hash function output, with the probability decreasing for subsequent bits of the Bloom filter array, such that the Bloom filter array represents at least a same amount of data with a smaller array length as compared to a length of traditional Bloom filter array that is populated using a uniform distribution, and a likelihood of the Bloom filter array becoming saturated is reduced as compared to a likelihood of the traditional Bloom filter array becoming saturated.

2. The system of claim 1, wherein the first and second entries correspond to users who accessed media.

3. The system of claim 1, wherein the one or more processors are to estimate the cardinality by causing a numerical solver to solve for a number of entries that maximizes a likelihood of producing the union of the first and second entries.

4. The system of claim 1, wherein the estimate of the cardinality has an error, for a given amount of noise in ones of the first and second Bloom filter arrays, that has an absolute value that varies by less than 1% across a range of different values of a ratio of the cardinality to a length of the first and second Bloom filter arrays, the different values ranging from 0.125 to 8.

5. The system of claim 1, wherein the cardinality is a first cardinality and the union is a first union, the one or more processors to estimate a second cardinality of a second union of entries in the first and second Bloom filter arrays and at least one other Bloom filter array.

6. A method comprising:
accessing a first Bloom filter array generated by a first computer of a first database proprietor, the first Bloom filter array representative of first entries in a first database of the first database proprietor, the first entries allocated to ones of first elements in the first Bloom filter array based on a non-uniform distribution of outputs of a hash function applied to the first entries;
accessing a second Bloom filter array generated by a second computer of a second database proprietor, the second Bloom filter array representative of second entries in a second database of the second database proprietor, the second entries allocated to ones of second elements in the second Bloom filter array based on the non-uniform distribution of the outputs of the hash function applied to the second entries; and
estimating a cardinality of a union of the first and second entries based on the non-uniform distribution of the outputs of the hash function,
wherein the non-uniform distribution is a geometric distribution in which a leftmost bit of a Bloom filter array has a highest probability of mapping a hash function output, with the probability decreasing for subsequent bits of the Bloom filter array, such that the Bloom filter array represents at least a same amount of data with a smaller array length as compared to a length of traditional Bloom filter array that is populated using a uniform distribution, and a likelihood of the Bloom filter array becoming saturated is reduced as compared to a likelihood of the traditional Bloom filter array becoming saturated.

7. The method of claim 6, wherein the first and second entries correspond to users who accessed media.

8. The method of claim 6, further including estimating the cardinality by causing a numerical solver to solve for a few entries that maximizes a likelihood of producing the union of the first and second entries.

9. The method of claim 6, wherein the estimate of the cardinality has an error that remains substantially consistent, for a given amount of noise in ones of the first and second Bloom filter arrays, across a range of different values of a ratio of the cardinality to a length of the first and second Bloom filter arrays, the different values ranging from 0.125 to 8.

10. The method of claim 6, wherein the cardinality is a first cardinality, and the union is a first union, the method further including estimating a second cardinality of a second union of entries in the first and second Bloom filter arrays and at least one other Bloom filter array.

11. A system comprising:
a communication interface to:
access a first Bloom filter array generated by a first computer of a first database proprietor, the first Bloom filter array representative of first users who accessed media, the first users allocated to ones of first elements in the first Bloom filter array based on a non-uniform distribution of outputs of a hash function applied to the first users, and
access a second Bloom filter array generated by a second computer of a second database proprietor, the second Bloom filter array representative of second users who accessed media, the second users allocated to ones of second elements in the second Bloom filter array based on the non-uniform distribution of the outputs of the hash function applied to the second users;
one or more processors; and
machine readable instructions to cause the one or more processors to estimate a cardinality of a union of the first and second users based on the non-uniform distribution of the outputs of the hash function,
wherein the non-uniform distribution is a geometric distribution in which a leftmost bit of a Bloom filter array has a highest probability of mapping a hash function output, with the probability decreasing for subsequent bits of the Bloom filter array, such that the Bloom filter array represents at least a same amount of data with a smaller array length as compared to a length of traditional Bloom filter array that is populated using a uniform distribution, and a likelihood of the Bloom filter array becoming saturated is reduced as compared to a likelihood of the traditional Bloom filter array becoming saturated.

12. The system of claim 11, wherein a smallest one of the different sized proportions is greater than or equal to a threshold defined based on a universe estimate of a population of possible audience members of the media.

13. The system of claim 11, wherein the one or more processors are to estimate the cardinality by causing a numerical solver to solve for several users that maximizes a likelihood of producing the union of the first and second users.

14. The system of claim 11, wherein the estimate of the cardinality has an error, for a given amount of noise in ones of the first and second Bloom filter arrays, that has an absolute value that varies by less than 1% across a range of different values of a ratio of the cardinality to a length of the first and second Bloom filter arrays, the different values ranging from 0.125 to 8.

* * * * *